United States Patent
Gopal et al.

(10) Patent No.: US 12,534,299 B2
(45) Date of Patent: Jan. 27, 2026

(54) ANTIMICROBIAL/ANTIVIRAL CONVEYOR BELT

(71) Applicant: Ascend Performance Materials Operations LLC, Houston, TX (US)

(72) Inventors: Vikram Gopal, Houston, TX (US);
Dhruv Shah, Houston, TX (US);
Changizes Sadr, Houston, TX (US);
Austin Maples, Houston, TX (US);
Bradley Sparks, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 659 days.

(21) Appl. No.: 17/946,514

(22) Filed: Sep. 16, 2022

(65) Prior Publication Data

US 2023/0088990 A1 Mar. 23, 2023

Related U.S. Application Data

(60) Provisional application No. 63/245,111, filed on Sep. 16, 2021.

(51) Int. Cl.
*B65G 15/38* (2006.01)

(52) U.S. Cl.
CPC .......... *B65G 15/38* (2013.01); *B65G 2207/26* (2013.01)

(58) Field of Classification Search
CPC ........ B65G 15/32; B65G 15/38; B65G 17/08; B65G 2207/26; C08K 2003/0893; C08K 2003/2296; C08K 3/015; C08K 3/08; C08K 3/22; C08L 51/06; C08L 77/02; C08L 77/06

See application file for complete search history.

(56) References Cited

U.S. PATENT DOCUMENTS

| | | | |
|---|---|---|---|
| 4,701,518 A | 10/1987 | Osborn et al. | |
| 6,039,964 A | 3/2000 | Sanduja et al. | |
| 6,584,668 B2 | 7/2003 | Green et al. | |
| 10,662,561 B2 | 5/2020 | Yung et al. | |
| 2002/0179417 A1 | 12/2002 | Cediel et al. | |
| 2004/0007448 A1 | 1/2004 | Cediel et al. | |
| 2011/0182959 A1 | 7/2011 | Cahill et al. | |
| 2020/0102673 A1 | 4/2020 | Dong et al. | |

FOREIGN PATENT DOCUMENTS

| | | |
|---|---|---|
| DE | 19847626 B4 | 8/2004 |
| EP | 3106481 A1 | 12/2016 |

OTHER PUBLICATIONS

International Application PCT/US2022/043801, "International Search Report", mailed Dec. 20, 2022, 13 pages.

*Primary Examiner* — Lawrence D Ferguson
(74) *Attorney, Agent, or Firm* — Womble Bond Dickinson (US) LLP

(57) ABSTRACT

An antimicrobial conveyor belt apparatus comprising multiple segments each having a body portion and interlocking fingers extending from the body portion. The segments comprise a polymer composition comprising from 50 wt. % to 99.9 wt. % of a polymer, from 0.01 wt % to 10 wt % zinc, optionally from a zinc compound, less than 1 wt % of a phosphorus compound, and from 0 wt % to 20 wt % molding additives. The conveyor belt apparatus (or the segments thereof) demonstrates a *Staphylococcus aureus* log reduction greater than 1.0, as determined via ISO 22196:2011.

18 Claims, 4 Drawing Sheets

ANTIMICROBIAL/ANTIVIRAL CONVEYOR BELT

CROSS REFERENCE

This application is related to and claims priority to U.S. Provisional Application No. 63/245,111, filed Sep. 16, 2021, which is incorporated herein by reference.

FIELD

The present disclosure relates to antimicrobial/antiviral (AM/AV) belt apparatuses having antimicrobial and/or antiviral properties. In particular, the present disclosure relates to AM/AV conveyor belts formed from a polymer composition comprising unique antimicrobial components.

BACKGROUND

There is a growing interest in products, e.g., molded products, having antiviral and/or antimicrobial properties. One particular example is industrial conveyor belts that may be used in many industries including, for example, healthcare, hospitality, pharmaceutical, food preparation, military, and athletics, among others.

Conventional belts are not made, e.g., molded, from materials that have "built-in" AM/AV properties. For example, these belts are made from standard (hydrophobic) olefin polymers, not AM/AV polymer compositions. As a result, these conventional belts do not have the valuable AM/AV properties that would be useful in the aforementioned applications.

In an attempt to achieve AM/AV properties, conventional techniques have applied a number of treatments or coatings to conventional molded products to impart antimicrobial properties thereto. Coating compounds containing copper, silver, gold, or zinc, either individually or in combination, have been used in these applications.

In the healthcare and food preparation industries in particular, certain items are required to be sanitary at all times. To comply with these sanitation standards, the items are subject to daily washing and, often times, bleaching. Thus, in many applications repeated cycles of use, washing, or soaking are quite common. This repeated cleaning accounts for significant downtime, which creates deleterious production inefficiencies. Further, unfortunately, conventional molded products (and the coatings thereon) have been found to deteriorate and lose AM/AV properties during repeated uses and/or wash cycles. Stated another way, the conventional products do not have sufficient resistance, e.g., chemical resistance, to cleaning/sterilization processes.

Further, the conventional coated products have not demonstrated effective and lasting AM/AV properties, especially when employed in applications where the coating is compromised by constant contact, e.g., by humans or by other machinery. In addition, conventional AM/AV treatments/coatings may be detrimentally extracted from conventional fabrics, which results in undesired environmental consequences.

As noted above, many conventional conveyor belts employ non-nylon polymers, e.g., olefin polymers, as the main polymer component. These materials, however, have been found to be ineffective in these applications because the performance characteristics associated with their chemistries. As one example, olefin polymers, do not have sufficient strength or chemical performance. Further, the olefin polymers may not demonstrate effective impact and/or chemical resistance performance.

As one example of a polymer coating composition, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

Some synthetic fibers having antimicrobial fibers are also known in the art. For example, U.S. Pat. No. 4,701,518 discloses an antimicrobial nylon prepared in water with a zinc compound phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications. Furthermore, the conventional additives added to polymer compositions to impart antimicrobial properties in the synthetic fibers made therefrom have been found to reduce the relative viscosity in the polymer compositions. This reduced relative viscosity produces processing difficulties and also would likely not be suitable for molded products, which are produced by entirely different processes.

As another example, US Publication No. 2020/0102673 discloses antimicrobial fibers that include antimicrobial nanoparticles dispersed substantially uniformly in a polymer matrix. Textiles and other materials can be formed from such fibers. The fibers may be formed via a masterbatch process or in a process wherein the antimicrobial nanoparticles, polymeric component, and additive(s) are melt processed together directly. Devices can be at least partially formed from polymer materials that include antimicrobial nanoparticles dispersed substantially uniformly in a polymer matrix. Again, the teachings in this reference are not applicable to the AM/AV molded products disclosed herein.

Although some references may teach the use of antimicrobial agents in combination with a polymer to make fibers, a need exists for durable AM/AV molded products, e.g., conveyor belts, that have AM/AV properties and that retain these properties, while also being able to achieve mechanical performance and chemical resistance.

SUMMARY

Figure 1A:
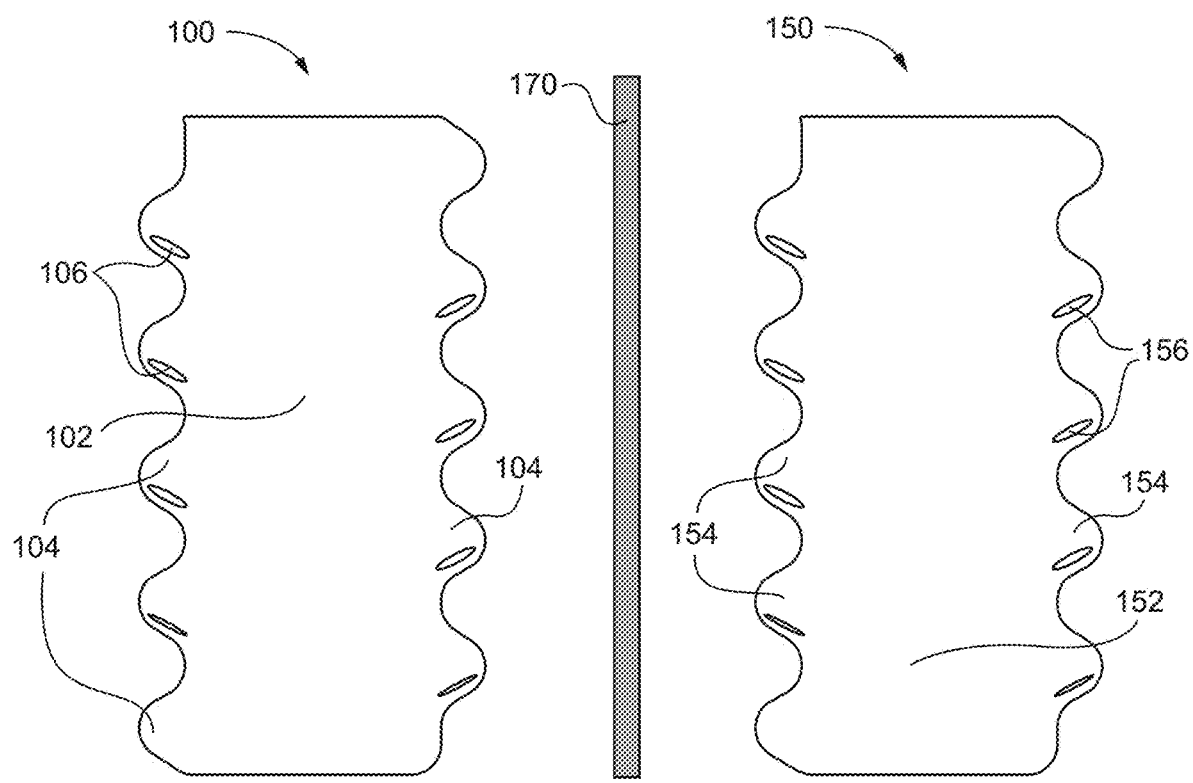
FIG. 1A shows two exemplary segments and a connecting rod used to form an exemplary conveyor belt.

In some cases, the present disclosure relates to an antimicrobial conveyor belt apparatus comprising multiple segments each having a body portion and interlocking fingers extending from the body portion; The segments comprise (or are made from) a polymer composition comprising from 50 wt. % to 99.9 wt. % of a polymer (for example PA-6,6 or PA-6 or PA-6,12, or combinations thereof), from 0.01 wt % to 10 wt % (for example, from 1000 ppm to 7000 wppm) zinc, optionally from a zinc compound, less than 1 wt % of a phosphorus compound, optionally from 2 wt % to 20 wt % of impact modifier, and from 0 wt % to 20 wt % molding additives. The belt apparatus demonstrates a *Staphylococcus aureus* log reduction greater than 1.0, as determined via ISO 22196:2011; an *Escherichia coli* log reduction greater than 1.0, as determined via ISO 22196:2011; a *Klebsiella pneumonia* log reduction greater than 1.0, as determined via ISO 22196:2011; and/or a tensile modulus greater than 2500 MPa and/or a Charpy un-notched impact energy loss greater than 70 kJ/m$^2$, at 23° C. The fingers of one of the segments may interlock with the fingers of an adjacent segment, at least one of the fingers each segment may a aperture extending therethrough, and the aperture of one of the segments aligns with the aperture of an adjacent segment to define an opening extending through the respective interlocking fingers. A connecting rod may extend through the path. The relative viscosity of the segments or the polymer composition may be greater than 20. The segments may comprise a partial layer (comprising a partial layer polymer composition) to prevent slippage. The partial layer polymer composition may comprise olefins, polyesters, polyamides, vulcanizates, or polyurethanes, or combinations thereof, for example a rubber-based material (for example, santoprene or modified santoprene comprising santoprene and polyamide) or a flexible polyamide) and may also comprise an AM/AV compound. The surface tension of the polymer composition may be at least 1% greater than the surface tension of the sticky polymer composition. The polymer may be hydrophilic and/or hygroscopic and capable of absorbing greater than 1.5 wt % water, based on the total weight of the polymer. The polymer composition may comprises from 0.1 to 5 wt % heat stabilizer and/or from 0.05 wt % to 3 wt % melt stabilizer.

DETAILED DESCRIPTION

Introduction

As discussed above, conventional molded products, e.g., conveyor belts apparatuses, are not made, e.g., molded, from materials that have "built-in" AM/AV properties. Conventional belts are typically made from standard olefin polymers, not AM/AV polymer compositions. As a result, these conventional belts do not have the valuable AM/AV properties that would be useful in the aforementioned applications. AM/AV coatings may be applied to address this shortcoming. Some antiviral polymer compositions and fabrics utilize AM/AV coatings, e.g., additives such as silver, coated or applied as a film on an exterior layer, to inhibit viruses and other pathogens. However, it has been found that these treatments or coatings often present a host of problems including, but not limited to poor AM/AV retention, insufficient (chemical) resistance to cleaning/sterilization processes, deleterious extraction of the additives, and poor durability/retention performance when employed in applications where the coating is compromised by constant contact. Further, the required cleaning of conventional belts accounts for significant downtime, which creates production inefficiencies. In addition to this problem, the inventors have discovered that some antiviral additives may negatively impact the relative viscosity (RV) and/or strength performance of the resultant polymer compositions and molded products. In particular, molded products such as conveyor belts face all of these problems.

It has now been found that the use of a polymer composition comprising specific components, optionally employed in particular amounts, provides for molded products, e.g., conveyor belt apparatuses ("conveyor belts" or "belts"), that strike a synergistic balance between AM/AV properties, relative viscosity, mechanical performance, and chemical resistance. Without being bound by theory, the use of specific AM/AV compounds, e.g., zinc, copper, and/or silver compounds, in combination with particular polymers, e.g., polyamides, along with other molding composition additives such as antioxidants, stearates, waxes, etc., provides for AM/AV efficacy, while also providing suitable RV for molding operations.

In addition, it has been discovered the that having or maintaining specific levels of hydrophilicity and/or hygroscopy in the polymer allows for and advantageously improves the ability of the molded products to contact and kill microbials and/or viruses. The inventors have also found that certain hydrophilic substrates may better attract liquid media that carry microbials and/or viruses, e.g., saliva or mucous. The employment of the disclosed AM/AV agents in such substrates, e.g., in the polymer matrices thereof, can be used to more effectively combat the microbials and/or viruses, versus a less hydrophilic substrate. The hydrophilicity and/or hygroscopy contributes to ability of the molded products to be water-friendly, which promotes microbial/virus contact with (small but effective amounts of) water, which in turn promotes more effective reduction/killing of microbials and/or viruses. In contrast, typical conveyor belts are made from olefin polymers, which are not nearly as hygroscopic, and as such, do not provide for the improved AM/AV performance discussed herein. At least some of these benefits are achieved while still maintaining mechanical/chemical resistance performance suitable for molded product applications.

In addition, it is postulated that the use of the aforementioned components (including the molding additives) in the specific amounts may allow the zinc compound (zinc) or copper compound (copper) to be more stably disposed in the polymer matrix and, as such, may retard leaching of the zinc/copper compound from the molded products, e.g., during everyday use or washing. Stated another way, the polymer composition may have certain amounts of a zinc/copper and optionally phosphorus embedded in the polymer matrix such that the polymer composition maintains a higher relative viscosity and retains antimicrobial properties during and after use. In addition, the use of the phosphorus compound, in some cases, in the specific amounts may work with the zinc/copper to improve the relative viscosity of the polymer matrix.

As a result of the composition of the polymer, the disclosed products made from the polymer compositions advantageously eliminate the need for a topical treatment to make product antiviral. The present AM/AV products have "built-in" AM/AV properties. And these properties beneficially will not extract out, e.g., wash away, after use. Stated another way, the disclosed AM/AV products have durable AM/AV properties that are not easily rubbed off or worn away. Importantly, excessive cleaning of the conveyor belts to maintain sanitation standards (in conventional belts), can be reduced or eliminated due to the AM/AV properties of the disclosed belts.

Some references, e.g., (carpet) fiber-related references, have disclosed the use of an antimicrobial nylon prepared in water with a zinc compound and phosphorus compound to form the carpet fibers. These references, however, relate to higher denier carpet fibers/filaments. These teachings (and fiber teachings generally), however are typically not relevant to other larger, more substantive, products, e.g., molded products, used in furniture or medical devices. Carpet fibers are formed via entirely different, non-analogous processes equipment, which results in entirely different products. Importantly, the relative viscosity required by these processes is typically much less than the relative viscosity required to make molded products. In view of these significant differences, the teachings of such fiber references are not typically considered relevant to molded products. Also, fibers do not demonstrate the mechanical performance necessary for many molded product applications. Further, because the fiber production process is entirely different from the molding process, these references do not disclose or contemplate the use of molding additives or the complexities associated therewith.

Also, although some references directly mix antiviral and/or antimicrobial agents with fibers, leathers, or plastics, these references do not address/solve problems of deterioration of the antiviral properties of the products, e.g., via extraction loss during use or washing/cleaning and/or mechanical strength.

In addition, as a result of the formulations disclosed herein, the disclosed polymer compositions and products do not need to be (and are not) gelled, which adds complications to processing, e.g., compositional requirements to achieve the gelling and/or process requirements to do the same, as well as the inability to achieve high throughput. Thus, the disclosed polymers and products provide the additional advantages of not including components necessary for gelling as well as elimination of production steps related to the gelling process.

The disclosure also relates to processes for making AM/AV products, e.g., AM/AV conveyor belts. The processes comprises the steps of providing the polymer composition having AM/AV properties (or that provides for the AM/AV properties), and forming the polymer composition into the conveyor belt or into one or more of the segments that make up the conveyor belt.

High-Contact Products/Conveyor Belts

The present disclosure relates to various applications of the AM/AV polymer compositions and the polymer structures formed therefrom—in particular to AM/AV conveyor belts. As described above, these products demonstrate lasting AM/AV properties as well as chemical resistance and mechanical properties.

The polymer composition may be used in the preparation of a conveyor belt. The polymer compositions may be utilized for conveyor belts used in any setting. The conveyor belt may be entirely composed of a polymer composition in some cases. In some embodiments, the disclosed polymer composition is used to form a segment or multiple segments of the conveyor belt. In some embodiments, some of the segments are made from a composition other than the disclosed polymer compositions.

As discussed above, the polymer compositions described herein demonstrate antiviral properties, and these properties may be surprisingly enhanced by certain characteristics of the polymer composition. For example, the use of a hydrophilic and/or hygroscopic polymer improves, e.g., increases, the antiviral activity of the polymer composition. Moisture, e.g., moisture present on the skin, in sweat, or in saliva, typically facilitates viral transmission, and a hydrophilic and/or hygroscopic polymer composition may draw in virus-containing moisture. Thus, the polymer compositions may be especially useful for the aforementioned conveyor belts that come into contact with moisture during typical use. In particular, the moisture may be attracted to the composition, e.g., on a surface of the high-contact product, and the composition may then kill a virus contained therein. Thus, the disclosed polymer compositions may be used in forming (in whole or in part) conveyor belts that greatly reduce transmission of a virus.

Methods of making the high-contact product are not particularly limited, and conventional methods may be used. In some embodiments, for example, a hot melt polymerization may be used to prepare the polymer composition, which may then be extruded and/or formed into the high-contact product.

Conveyor Belt Apparatus

The structure of the conveyor belts may vary widely. And many designs and configurations are contemplated. The utilization of the disclosed polymer compositions in at least a part of the conveyor belts provides for or contributes to the AM/AV properties of the conveyor belt, as well as the mechanical and chemical resistance properties. The conveyor belt may comprise multiple segments. And one or more of the segments may be made from, e.g., molded from, the polymer compositions. A single segment belt apparatus is also contemplated.

In one embodiment, the conveyor belt comprises multiple segments, and the segments may be connected to one another to form a continuous conveyor belt. The shape of the segments and the method of connection may vary widely, and many shapes and connection configurations are contemplated. Exemplary conveyor belt subsections are shown in FIGS. 1-3, which are discussed below. Advantageously, the segments are modular and provide the ability to increase or decrease the overall length of the conveyor belt.

In some cases, one or more of the segments comprise a partial layer, e.g., a "sticky layer" made from a partial layer polymer composition, e.g., a "sticky polymer composition," to prevent slippage of the belt while in use. The sticky polymer composition may comprise a sticky polymer and optionally an AM/AV compound. The partial layer may be disposed on a portion of the segment(s). Advantageously, the composition of the polymer composition of the segment(s) may be such that it has a greater surface tension than that of the polymer composition of the partial layer, e.g., the sticky polymer. For example, the surface tension of the polymer composition may be at least 1% greater than the surface tension of the sticky polymer composition, e.g., at least 3% greater, at least 5% greater, at least 10% greater, at least 15% greater, at least 20% greater, at least 25% greater, at least 30% greater, at least 40% greater, at least 50% greater, at least 75% greater, at least 100% greater, or at least 150% greater.

In one embodiment, the sticky layer (sticky polymer composition) has a surface tension ranging from 32 dyne/cm to 52 dyne/cm, e.g., from 34 dyne/cm to 50 dyne/cm, from 36 dyne/cm to 48 dyne/cm, from 38 dyne/cm to 46 dyne/cm, or from 40 dyne/cm to 44 dyne/cm. In terms of lower limits, the sticky layer (sticky polymer composition) may have a surface tension greater than 32 dyne/cm, e.g., greater than 34 dyne/cm, greater than 36 dyne/cm, greater than 38 dyne/cm, greater than 40 dyne/cm, greater than 42 dyne/cm, or greater than 44 dyne/cm. In terms of upper limits, the sticky layer (sticky polymer composition) may have a surface tension less than 52 dyne/cm, e.g., less than 50 dyne/cm, less than 48 dyne/cm, less than 46 dyne/cm, less than 44 dyne/cm, less than 42 dyne/cm, or less than 40 dyne/cm.

In one embodiment, the segment base (polymer composition) has a surface tension ranging from 38 dyne/cm to 58 dyne/cm, e.g., from 40 dyne/cm to 56 dyne/cm, from 42 dyne/cm to 54 dyne/cm, from 44 dyne/cm to 52 dyne/cm, or from 46 dyne/cm to 50 dyne/cm. In terms of lower limits, the segment base (polymer composition) may have a surface tension greater than 38 dyne/cm, e.g., greater than 40 dyne/cm, greater than 42 dyne/cm, greater than 44 dyne/cm, greater than 46 dyne/cm, greater than 48 dyne/cm, or greater than 50 dyne/cm. In terms of upper limits, the segment base (polymer composition) may have a surface tension less than 58 dyne/cm, e.g., less than 56 dyne/cm, less than 54 dyne/cm, less than 52 dyne/cm, less than 50 dyne/cm, less than 48 dyne/cm, or less than 46 dyne/cm.

In some embodiments, the partial layer comprises a sticky AM/AV polymer composition that demonstrates the aforementioned AM/AV properties, and these AM/AV properties may be achieved as discussed herein with respect to the AM/AV compositions and segments. Stated another way, both the polymer composition of the segments and the sticky polymer composition of the partial layer may have AM/AV properties. The sticky polymer composition may comprise the AM/AV compounds disclosed herein and in the proportions disclosed herein. In some cases, it is also that the partial layer is made from a standard sticky polymer composition and does not have AM/AV properties. In some cases, the partial layer maybe configured in a pattern on the belt. In some cases, the partial layer comprises an impact-modified polymer.

In some embodiments, the sticky polymer of the partial layer may comprise olefins, polyesters, polyamides, vulcanizates, polyurethanes. These may be treated, e.g., maleated. In some specific cases, the partial layer may comprise thermoplastic elastomers, e.g., thermoplastic vulcanizate (TPV), polypropylene, polyethylene, styrene butadiene rubber (SBR), and/or nitrile butadiene rubber (NBR), and these may be optionally maleated. In some cases, the sticky polymer may comprise flexible nylon and/or TPV. Suitable commercial product include Pebax (Arkema), Hytrel (DuPont), Isoplast (Lubrizol).

In some cases, the partial layer may comprise a modified rubber-based polymer, e.g., a modified santoprene (a composition comprising rubber-based polymer and another polymer (such as a polyamide). As one example, the sticky polymer may comprise a rubber-based material, e.g., santoprene. In some embodiments, the partial layer comprises a modified santoprene comprising rubber-based polymer, e.g., santoprene, and the disclosed AM/AV polymer composition. As one example, the modified santoprene may comprise santoprene and AM/AV polymer composition comprising AM/AV compound and polyamide 66. Beneficially, when the partial layer comprises some content of AM/AV polymer compositions, processing efficiencies are unexpectedly improved. In addition, it has been discovered that the employment of a modified santoprene contributes to suitable performance features with a reduction in cost (versus pure santoprene). Generally, the addition of a lower-cost second polymer would be expected to lead to performance reductions.

In some cases, the sticky polymer may comprise a styrene-based polymer. In some embodiments when a styrene-based polymer is employed, the AM/AV agent is utilized with the styrene-based polymer.

In some cases, the sticky polymer may comprise flexible polyamide, optionally AM/AV flexible polyamide, (and the polymer composition optionally comprises polyamide).

In some cases, the sticky polymer may comprise polypropylene, optionally AM/AV polypropylene, (and the polymer composition optionally comprises polyamide).

In some embodiments, the partial layer(s) and the segment(s) are both made of a nylon material, and the nylon materials may differ from one another. Advantageously, the similar nylon chemistry provides for superior bonding between the segment and the partial layer (see additional discussion below). The use of the same nylons for these components is also contemplated.

In some cases, the partial layer does not contact the material that is conveyed by the conveyor belt, e.g., the rubber partial layer does not contact the food conveyed by the conveyor belt. In some cases, the partial layer does contact the containers/packages that are conveyed by the belt. In some embodiments, the segments and the partial layer have AM/AV properties, which advantageously may provide for an AM/AV surface upon which the containers/packages may be conveyed.

The bonding of the partial layer to the segments may be achieved via many techniques. Examples include, but are not limited to, mechanical fastening, adhesive fastening, molding, e.g., 2-shot injection molding, (multi-layer) co-extrusion, (multi-layer) blowing, Multi-layer) film casting. In some cases, mechanical bonding may be employed along with the other fastening techniques, e.g., to improve bonding between two substrates having dissimilar properties. In some embodiments, the mechanical bonding may be achieved in situ via tools and dies of the segments.

In some cases, the segments each have a body portion and fingers that extend from the body portion. In use, the fingers of one segment are arranged to interlock with the fingers of an adjacent segment to build the length of the conveyor belt. The fingers of the first segment of the belt length may then interlock with the fingers of the last segment to form the continuous conveyor belt.

In some embodiments, the interlocking of the fingers provides sufficient connectivity standing alone, e.g., the interlocking fingers provide a strong enough connection to one another without the need for further attachment devices. In some cases, (additional) attachment pieces may be employed. These attachment pieces may vary widely and can include, for example, mechanical fasteners, e.g., ties, staples, and/or nails, rods etc., or adhesive fasteners.

In some cases, the finger(s) of each segment defines a hollow aperture extending therethrough. In use, as the fingers of the respective segments interlock with one another, the respective apertures of the fingers align with one another to define an opening that extends through at least two fingers, e.g., at least 3 fingers, or through all of the interlocking fingers of two adjacent segments. In some cases, the apertures align to define an opening that extends the length of the interlocking segments.

In some embodiments, the conveyor belt comprises a connecting rod disposed in the opening formed by the alignment of the apertures, e.g., the rod extends through the path formed by multiple apertures. The connecting rod acts to secure the adjacent segments to one another. The composition of the rod may vary widely, e.g., metals, polymers (plastics), cellulose (wood), etc., and many suitable rod materials are known and available.

In some embodiments, the conveyor belt is a rigid belt capable of demonstrating a load capacity greater than 0.1 psi, e.g., greater than 1 psi, greater than 3 psi, or greater than 5 psi.

In other cases, the segments do not comprise fingers per se and are merely attached to one another via the attachment pieces. For example, rectangular segments may be attached, e.g., tied or stapled, to one another.

Figure 1B:
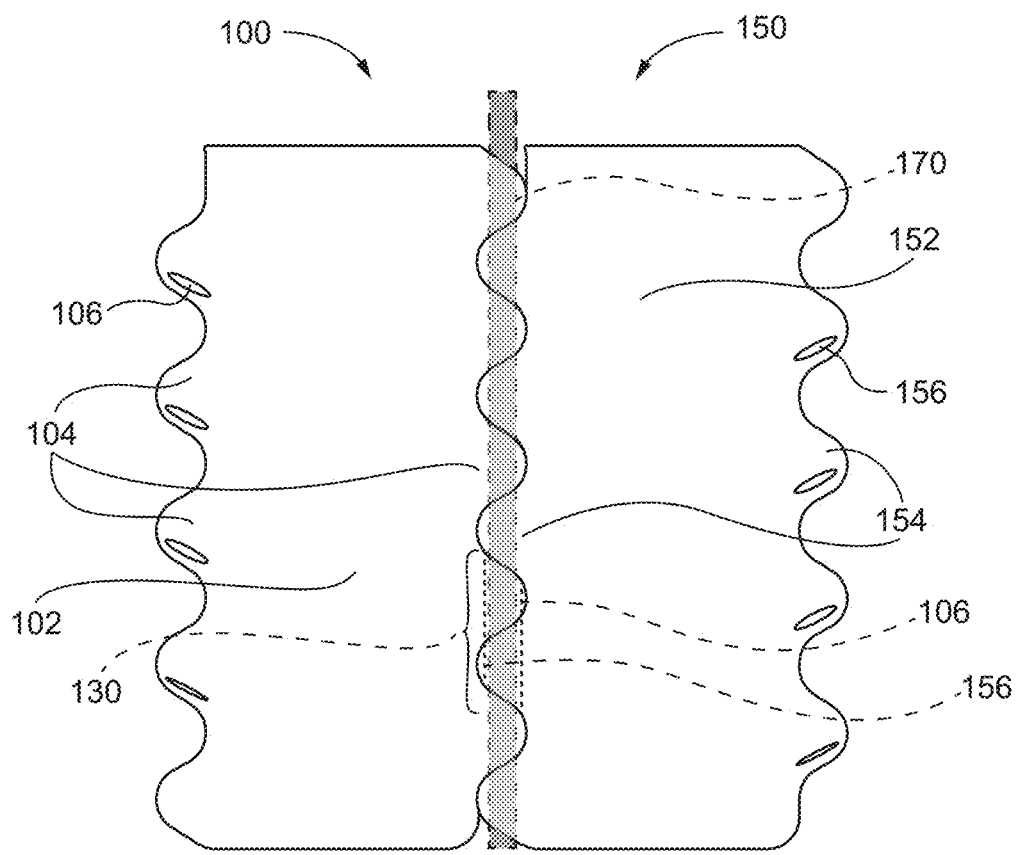
FIG. 1B shows the two exemplary segments and connecting rod from FIG. 1A connected to one another.

FIG. 1A shows two interlockable segments that may be used to form one embodiment of a conveyor belt. As shown, segment 100 comprises body portion 102 and fingers 104. Segment 150 comprises body portion 152 and fingers 154. In FIG. 1, fingers 104 and 154 are cylindrical in shape. Fingers 104 each define apertures 106, and fingers 154 define apertures 156. In use as shown in FIG. 1B, segment 100 and segment 150 are moved together such that fingers 104 and fingers 154 interlock with one another. In doing so, apertures 106 and 156 align with one another to define opening 130 that extends the length of the interlocking segments 100 and 150. Connecting rod 170 is shown exploded from segments 100 and 150. In use, connecting rod 170 is disposed in opening 130, which secures segments 100 and 150 to one another. The configuration of multiple segments may be repeated to form a length of segments, and the first and last segment may be likewise connected to form the conveyor belt.

Figure 2A:
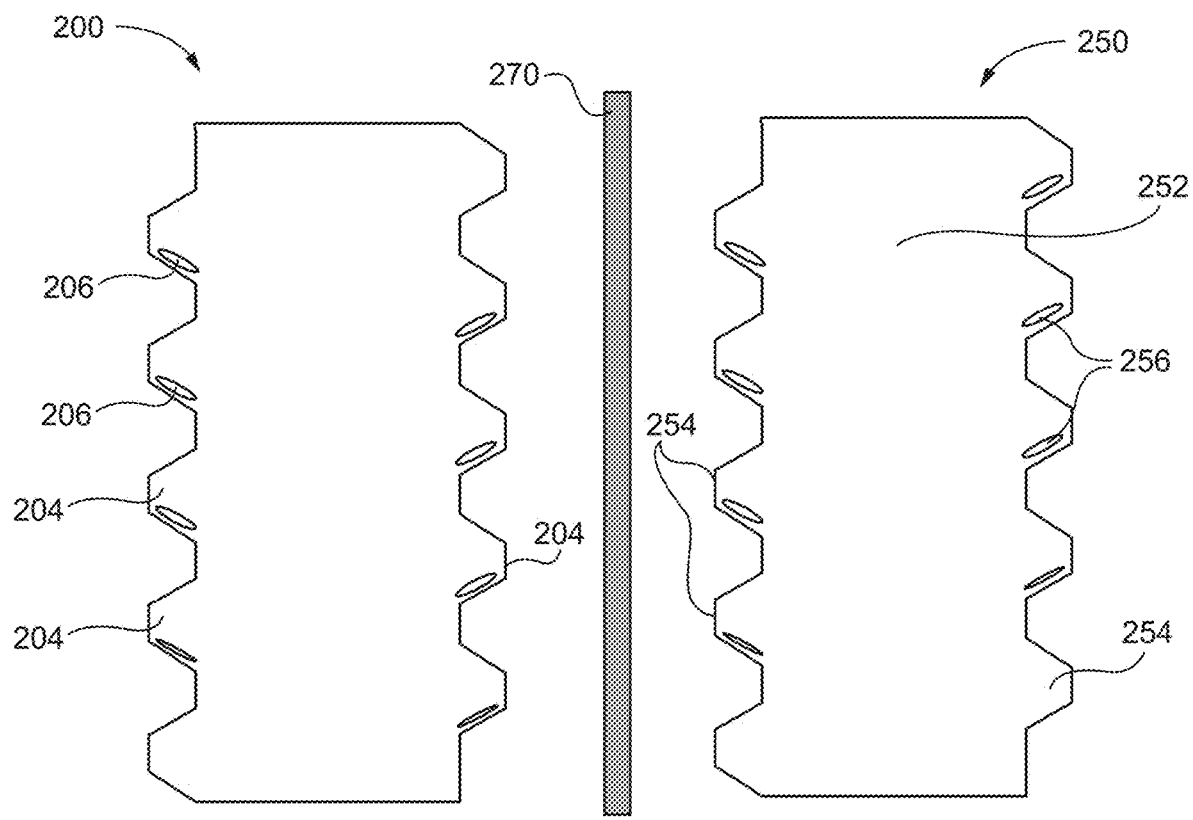
FIG. 2A shows two exemplary segments and a connecting rod used to form an exemplary conveyor belt.
Figure 2B:
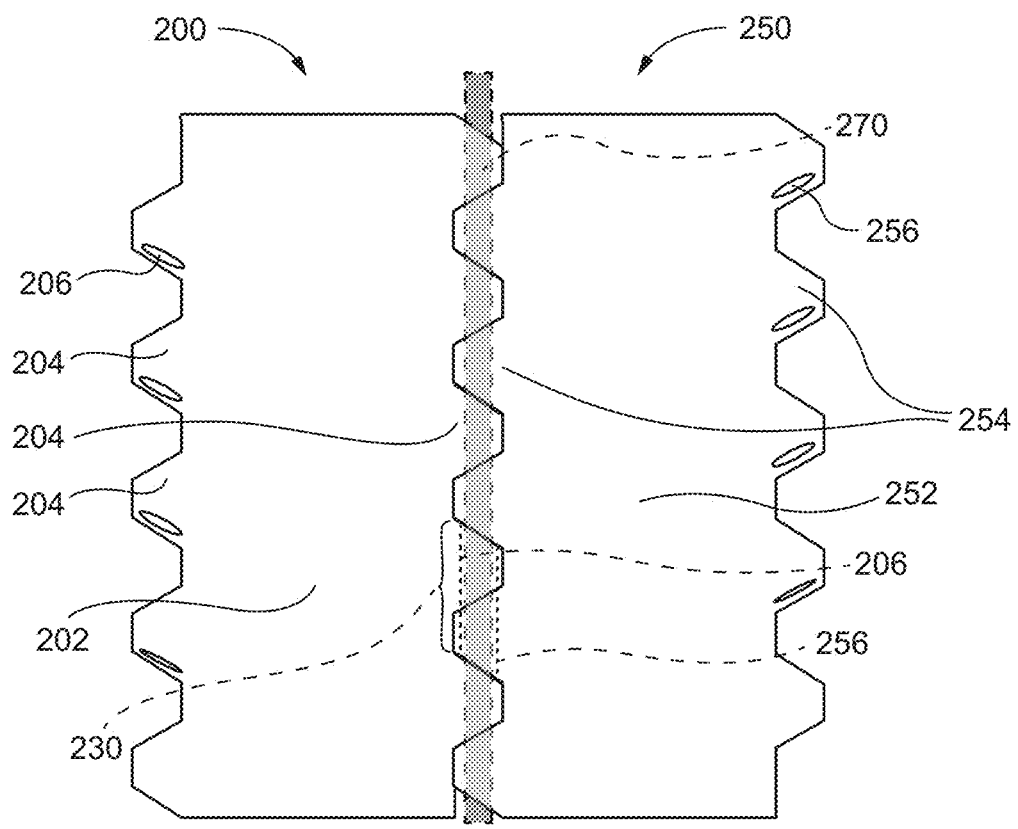
FIG. 2B shows the two exemplary segments and connecting rod from FIG. 2A connected to one another.

FIG. 2A shows two interlockable segments that may be used to form one embodiment of a conveyor belt. As shown, segment 200 comprises body portion 202 and fingers 204. Segment 250 comprises body portion 252 and fingers 254. In FIG. 2, fingers 204 and 254 are triangular in shape. Fingers 204 each define apertures 206, and fingers 254 define apertures 256. In use as shown in FIG. 2B, segment 200 and segment 250 are moved together such that fingers 204 and fingers 254 interlock with one another. In doing so, apertures 206 and 256 align with one another to define opening 230 that extends the length of the interlocking segments 200 and 250. Connecting rod 270 is shown exploded from segments 200 and 250. In use, connecting rod 270 is disposed in opening 230, which secures segments 200 and 250 to one another. The configuration of multiple segments may be repeated to form a length of segments, and the first and last segment may be likewise connected to form the conveyor belt.

Polymer Composition

As noted above, the present disclosure relates to polymer compositions that beneficially exhibit AM/AV properties, and the conveyor belts and segments thereof likewise exhibit AM/AV properties. In some embodiments, the polymer compositions comprise a polymer, zinc (provided to the composition via a zinc compound), and/or copper (provided to the composition via a copper compound), and/or phosphorus (provided to the composition via a phosphorus compound). The polymer composition may further comprise molding additives. Such molding additives are generally not present in polymer compositions designed for other end products, e.g., fibers/fabrics, since there is typically no use for them. For example, the polymer may be present in an amount ranging from 50 wt. % to 99.9 wt. %; the zinc may be present in an amount ranging from 0.01 wt % to 10 wt %; and the phosphorus may be present in an amount less than 1 wt. %. The molding additives may be present in an amount ranging from 0.01 wt % to 20 wt %. Additional concentration ranges and limits are disclosed herein. The present disclosure also relates to polymer compositions that comprise a polymer, copper (provided to the composition via a copper compound), and phosphorus (provided to the composition via a phosphorus compound). For example, the polymer may be present in an amount ranging from 50 wt. % to 99.9 wt. %; the copper may be present in an amount ranging from 10 wppm to 20,000 wppm; and the phosphorus may be present in an amount less than 1 wt. %. The polymer compositions may be used to form molded products, and, in addition to improved AM/AV performance, the products demonstrate superior mechanical properties, e.g., tensile strength or impact resistance (as described herein). The products may demonstrate superior zinc/copper retention rates, when tested in a dye bath test or a wash test (as described herein).

Polymer

The polymer composition comprises a polymer, which, in some embodiments, is a polymer suitable for producing molded products. In one embodiment, the polymer composition comprises a polymer in an amount ranging from 50 wt. % to 100 wt. %, e.g., from 50 wt. % to 99.99 wt. %, from 50 wt. % to 99.9 wt. %, from 50 wt. % to 99 wt. % from 55 wt. % to 100 wt. %, from 55 wt. % to 99.99 wt. %, from 55 wt. % to 99.9 wt. %, from 55 wt. % to 99 wt. %, from 60 wt. % to 100 wt. %, from 60 wt. % to 99.99 wt. %, from 60 wt. % to 99.9 wt. %, from 60 wt. % to 99 wt. %, from 60 wt % to 96 wt %, from 65 wt. % to 100 wt. %, from 65 wt. % to 99.99 wt. %, from 65 wt. % to 99.9 wt. %, or from 65 wt. % to 99 wt. %, from 65 wt % to 96 wt %, from 70 wt % to 96 wt %, or from 60 wt % to 99.5 wt %. In terms of upper limits, the polymer composition may comprise less than 100 wt. % of the polymer, e.g., less than 99.99 wt. %, less than 99.9 wt. %, less than 99 wt. %, less than 97%, less than 96%, or less than 95%. In terms of lower limits, the polymer composition may comprise greater than 50 wt. % of the polymer, e.g., greater than 55 wt. %, greater than 60 wt. %, or greater than 65 wt. %.

The concentration ranges and limits disclosed herein relate to formulations that do not include fillers, e.g., glass. Filled formulations are also within the contemplation of this disclosure. The re-calculation of the concentrations of the various components (if a filler is included) can be made by the skilled chemist, and such calculations and adjustments are contemplated. In some cases, the concentration ranges and limits disclosed herein may be based on the total weight of the non-filler components, e.g., polymer, AM/AV compound, phosphorus compound and molding additives.

The polymer of the polymer composition may vary widely. The polymer may include but is not limited to, a thermoplastic polymer, polyester, nylon (polyamide 6, polyamide 6,6), rayon, acetal, polyethylene (PE), polypropylene (PP), polyethylene terephthalate (PET), polyethylene terephthalate glycol (PETG), co-PET, polylactic acid (PLA), and polytrimethylene terephthalate (PTT).

In some cases, the polymer composition may comprise polyamides. Common polyamides include nylons and aramids. For example, the polyamide may comprise PA-4T/4I; PA-4T/6I; PA-5T/5I; PA-6; PA-6,6; PA-6,6/6; long chain polyamide (such as PA-10; PA-12; PA-6,10; PA-6,12, as well as other known long chain variants optionally including aromatic components, e.g., T and I components, in particular for use as brush bristles); PA-6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and copolymers, blends, mixtures and/or other combinations thereof.

Additional suitable polyamides, additives, and other components are disclosed in U.S. patent application Ser. No. 16/003,528. Such polymers may synergistically work well with the other components of the polymer composition due to the hydrophilic and/or hygroscopic properties thereof.

In some preferred cases, the polyamide-based, e.g., nylon-based, compounds are utilized as the polymer. It has surprisingly been found that these nylon-based polymers, when utilized with the aforementioned zinc compound, copper compound, and phosphorus compound additives and formed into molded products, provide the antiviral and/or antimicrobial characteristics. In some cases, it has been found that conventional polymers that utilize polyester polymers harbor and allow to flourish different types of viruses and/or bacteria, as compared to those of nylon. For example, micrococcus bacteria have been found to flourish in polyester-based fabrics and produce high odor levels. Thus the use of nylon-based polymers, along with the aforementioned additives, surprisingly has been found to yield fabrics that demonstrate significantly low odor levels as compared to similar fabrics that utilize polyesters.

The polymer composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA-6,6, and PA-6,6/6T. In these embodiments, the polyamide may comprise from 1 wt. % to 99 wt. % PA-6, from 30 wt. % to 99 wt. % PA-6,6, and from 1 wt. % to 99 wt. % PA-6,6/6T. In some embodiments, the polyamide comprises one or more of PA-6, PA-6,6, and PA-6,6/6T. In some aspects, the polymer composition comprises 6 wt. % of PA-6 and 94 wt. % of PA-6,6. In some cases, the polymer comprises PA-6, and PA-6,6. In some cases, the polymer comprises PA-6,12. In one embodiment, the polymer comprises PA-6,6/6,12, alone or in combination with additional polyamides. In some aspects, the polymer composition comprises copolymers or blends of any of the polyamides mentioned herein.

In some cases, the polymer comprises nylons and/or acetals. In some cases, PA-6,12 is utilized, and its overall performance unexpectedly exceeds other nylons.

The polymer compositions surprisingly may benefit from a polymer having increased hydrophilicity and/or hygroscopy. In particular, the use of a hydrophilic and/or hygroscopic polymer may increase the antiviral properties of the polymer composition. It is postulated that viruses and/or microbials are carried by liquids like saliva and mucous. Also, it is theorized that a polymer of increased hydrophilicity and/or hygroscopy both may better attract liquid media that carry microbials and/or viruses, e.g., saliva or mucous, and may also absorb more moisture, e.g., from the air. and that the increased moisture content allows the polymer composition and the antiviral/antimicrobial agent to more readily limit, reduce, or inhibit infection and/or pathogenesis of a virus. For example, the moisture may dissolve an outer layer, e.g., capsid, of a virus, exposing the genetic material, e.g., DNA or RNA, of the virus. The exposed genetic material is more susceptible to deactivation by other components of the polymer composition, e.g., the zinc compound, phosphorus compound, and/or copper compound (discussed below). This is one surprising, synergistic results of using polymers having higher levels of hydrophilicity and/or hygroscopy. In contrast, a molded products formed from less hydrophilic and/or hygroscopic polymers, e.g., polypropylene, may not attract the fluids, and may not be as effective.

In some cases, the polymer comprises a styrene-based polymer. For example, the styrene-based polymer may be a part of the polymer. In some embodiments, the styrene-based polymer, e.g., SEBS may be a soft block in the polymer chain, and this polymer structure may provide for an increase in friction and/or surface tension. In some embodiments when a styrene-based polymer is employed, and the AM/AV agent is utilized with the styrene-based polymer.

In some embodiments, the polymer composition may comprise (smaller amounts of) PET, for its strength, longevity during washing, ability to be made permanent press, and ability to be blended with others.

In some embodiments, the polymer may be nylon 6,6. In some cases, nylon is known to be stronger than PET and exhibits a non-drip burning characteristic that is beneficial e.g., in military or automotive textile applications, and is more hydrophilic than PET. The polymer used in the present disclosure can be a polyamide, polyether amide, polyether ester or polyether urethane or a mixture thereof.

In some cases, the polymer compositions may comprise (smaller amounts of) polyethylene. Suitable examples of polyethylene include linear low-density polyethylene (LLDPE), low-density polyethylene (LDPE), medium-density polyethylene (MDPE), high-density polyethylene (HDPE), and ultra-high-molecular-weight polyethylene (UHMWPE).

In some cases, the polymer compositions may comprise (smaller amounts of) polycarbonate (PC). For example, the polymer composition may comprise a blend of polycarbonate with other polymers, e.g., a blend of polycarbonate and acrylonitrile butadiene styrene (PC-ABS), a blend of polycarbonate and polyvinyl toluene (PC-PVT), a blend of polycarbonate and polybutylene terephthalate (PC-PBT), a blend of polycarbonate and polyethylene terephthalate (PC-PET), or combinations thereof.

Although olefins or other non-nylons may be employed, these polymers may be only used in smaller amounts, e.g., versus the nylon or acetal polymer. For example the non-nylons may be employed in an amount less than 50 wt % of the total polymer, e.g., less than 25 wt %, less than 15 wt %, less than 10 wt %, less than 5 wt %, or less than 1 wt %.

In some cases, conventional surface modifiers, such as citric acid, are applied to or sprayed on the surface of the polymer compositions (or of articles formed therefrom). By using a hydrophilic and/or hygroscopic polymer, the polymer compositions of the present disclosure may not require any such solubility modifiers.

In some other embodiments however, the products formed from the polymer compositions may be treated, e.g., with citric acid, to make them even more hydrophilic and/or hygroscopic.

In some cases, the hydrophilicity and/or hygroscopy of a polymer may be measured by saturation.

In some cases, the hydrophilicity and/or hygroscopy of a polymer may be measured by the amount of water it can absorb (as a percentage of total weight). In some embodiments, the hydrophilic and/or hygroscopic polymer is capable of absorbing greater than 1.5 wt % water, based on the total weight of the polymer, e.g., greater than 2.0 wt %, greater than 3.0%, greater than 5.0 wt %, or greater than 7.0 wt %. In terms of ranges, the hydrophilic and/or hygroscopic polymer may be capable of absorbing water in an amount ranging from 1.5 wt % to 10.0 wt %, e.g., from 1.5 wt % to 9.0 wt %, from 2.0 wt % to 8 wt %, from 2.0 wt % to 7 w %, of from 2.5 wt % to 7 wt. %. The ability to absorb more moisture allows the polymer compositions to better reduce or inhibit the growth of the microbials and/or viruses that are contained therein (as discussed above).

As noted above, some applications of the polymer compositions described herein surprisingly may benefit from increased hygroscopy. An increase in hygroscopy may be achieved in the selection and/or modification the polymer. In some embodiments, the polymer may be a common polymer, e.g., a common polyamide, which has been modified to increase hygroscopy. In these embodiments, a functional endgroup modification on the polymer may increase hygroscopy. For example, the polymer may be PA-6,6, which has been modified to include a functional endgroup that increases hygroscopy.

The polymer composition may also comprise polyamides produced through the ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. In those embodiments, the polymer comprises at least 10 wt. % caprolactam, e.g., at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. %. In some embodiments, the polymer includes from 10 wt. % to 60 wt. % of caprolactam, e.g., from 15 wt. % to 55 wt. %, from 20 wt. % to 50 wt. %, from 25 wt. % to 45 wt. %, or from 30 wt. % to 40 wt. %. In some embodiments, the polymer comprises less than 60 wt. % caprolactam, e.g., less than 55 wt. %, less than 50 wt. %, less than 45 wt. %, less than 40 wt. %, less than 35 wt. %, less than 30 wt. %, less than 25 wt. %, less than 20 wt. %, or less than 15 wt. %. Furthermore, the polymer composition may comprise the polyamides produced through the copolymerization of a lactam with a nylon, for example, the product of the copolymerization of a caprolactam with PA-6,6.

In some aspects, the polymer can formed by conventional polymerization of the polymer composition in which an aqueous solution of at least one diamine-carboxylic acid salt is heated to remove water and effect polymerization to form an antiviral nylon. This aqueous solution is preferably a mixture which includes at least one polyamide-forming salt in combination with the specific amounts of a zinc compound, a copper compound, and/or a phosphorus compound described herein to produce a polymer composition. Conventional polyamide salts are formed by reaction of diamines with dicarboxylic acids with the resulting salt providing the monomer. In some embodiments, a preferred polyamide-forming salt is hexamethylenediamine adipate (nylon 6,6 salt) formed by the reaction of equimolar amounts of hexamethylenediamine and adipic acid.

In some embodiments, the polymer compositions (and the belts produced therefrom) advantageously comprise little or no content of processing aids such as surfactants and/or coupling agents (see discussion above). In some cases, the polymer compositions comprise less than 100 wppm surfactant and/or coupling agent, e.g., less than 50 wppm, less than less than 20 wppm, less than 10 wppm, or less than 5 wppm. In terms of ranges, the polymer compositions may comprise from 1 wppb to 100 wppm, e.g., from 1 wppb to 20 wppm, from 1 wppb to 10 wppm, or from 1 wppb to 5 wppm. The disclosed compositions may not employ any surfactant and/or coupling agent at all. There can be no surfactant and/or coupling agent present after processing, which is not the case for conventional formulations that do employ surfactant and/or coupling agents as necessary components. Even though some of these components may burn off during processing, some surfactant and/or coupling agent will remain in the resultant belts.

Common surfactants include anionic surfactants, cationic surfactants and/or non-ionic surfactants. Specific examples are stearic acid, sodium dodecyl sulfonate surfactants, qua-ternary ammonium surfactants, amino acid surfactants, betaine surfactants, fatty acid glyceride ester surfactants, fatty acid sorbitan surfactants, lecithin surfactants, and/or Tween™ series surfactants. e.g., polyethoxylated sorbitan ester surfactants, nonionic polyoxyethylene surfactants, etc.

The inventors have found that the content of amine end groups (AEG) may have a surprising effect on the performance of the polymer compositions and molded products. As one example, the AEGs have been found to improve the ability to dye products. The polymer composition may have an AEG content ranging from 1 μeq/gram to 105 μeq/gram, e.g., from 1 μeq/gram to 75 μeq/gram, from 1 μeq/gram to 55 μeq/gram, from 5 μeq/gram to 50 μeq/gram, or from 15 μeq/gram to 40 μeq/gram. In terms of upper limits, the polymer composition may have an AEG content less than 105 μeq/gram, e.g., less than 100 μeq/gram, less than 90 μeq/gram, less than 75 μeq/gram, less than 55 μeq/gram, less than 50 μeq/gram, less than 45 μeq/gram, less than 40 μeq/gram, less than 35 μeq/gram, less than 30 μeq/gram, or less than 25 μeq/gram. In terms of lower limits, the polymer composition may have an AEG content greater than 1 μeq/gram, e.g., greater than 5 μeq/gram, greater than 10 μeq/gram, greater than 15 μeq/gram, greater than 20 μeq/gram, greater than 25 μeq/gram, greater than 35 μeq/gram, greater than 40 μeq/gram, or greater than 50 μeq/gram.

In some cases, a higher relative viscosity may be employed. In other cases, a lower relative viscosity may be employed. In these cases, the inventors have found that by using particular zinc and/or phosphorus content, along with specific polymer characteristics, unexpected efficiencies can be achieved, while also achieving AM/AV and mechanical performance. Examples of some specific formulations are provided below.

Zinc Compound

As noted above, the polymer composition includes zinc in a zinc compound and phosphorus in a phosphorus compound, preferably in specific amounts in the polymer composition, to provide the aforementioned structural and antiviral benefits. As used herein, "zinc compound" refers to a compound having at least one zinc molecule or ion (likewise for copper compounds). As used herein, "phosphorus compound" refers to a compound having at least one phosphorus molecule or ion. Zinc content may be indicated by zinc or zinc ion (the same is true for copper). The ranges and limits may be employed for zinc content and for zinc ion content, and for other metal content, e.g., copper content. The calculation of zinc ion content based on zinc or zinc compound can be made by the skilled chemist, and such calculations and adjustments are contemplated.

The inventors have found that the use of specific zinc compounds (and the zinc contained therein) and phosphorus compounds (and the phosphorus contained therein) at specific molar ratios minimizes the negative effects of the zinc compound on the polymer composition. For example, too much zinc compound in the polymer composition can lead to decreased polymer viscosity and inefficiencies in production processes.

The polymer composition may comprise zinc (e.g., in a zinc compound or as zinc ion), e.g., zinc or a zinc compound, dispersed within the polymer composition. In one embodiment, the polymer composition comprises zinc in an amount ranging from 5 wppm to 100,000 wppm (10 wt %), e.g., from 5 wppm to 30000 wppm, from 5 wppm to 20000 wppm, from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, 5000 wppm to 20000 wppm, from 200 wppm to 500 wppm, from 500 ppm to 10000 wppm, from 1000 ppm to 7000 wppm, or from 3000 ppm to 5000 wppm.

In terms of lower limits, the polymer composition may comprise greater than 5 wppm of zinc, e.g., greater than 10 wppm, greater than 50 wppm, greater than 100 wppm, greater than 200 wppm, greater than 300 wppm, greater than 350 wppm, greater than 375 wppm, greater than 400 wppm, greater than 425 wppm, greater than 480 wppm, greater than 500 wppm, greater than 600 wppm, greater than 1000 wppm, or greater than 3000 wppm.

In terms of upper limits, the polymer composition may comprise less than 20,000 wppm of zinc, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 7000 wppm, less than 5000 wppm, less than less than 4000 wppm, less than 3000 wppm, less than 2000 wppm, less than 1000 wppm, or less than 500 wppm. In some aspects, the zinc compound is embedded in the polymer formed from the polymer composition. The ranges and limits are applicable to both zinc in elemental or ionic form and to zinc compound). In some cases, the zinc (as the AM/AV compound) is independent of other zinc containing materials (such as, for example, zinc borate added as a flame retardant).

The zinc of the polymer composition is present in or provided via a zinc compound, which may vary widely. The zinc compound may comprise zinc oxide, zinc ammonium adipate, zinc acetate, zinc ammonium carbonate, zinc stearate, zinc phenyl phosphinic acid, or zinc pyrithione, or combinations thereof. In some embodiments, the zinc compound comprises zinc oxide, zinc ammonium adipate, zinc acetate, or zinc pyrithione, or combinations thereof. In some embodiments, the zinc compound comprises zinc oxide, zinc stearate, or zinc ammonium adipate, or combinations thereof. In some aspects, the zinc is provided in the form of zinc oxide. In some aspects, the zinc is not provided via zinc phenyl phosphinate and/or zinc phenyl phosphonate.

The inventors have also found that the polymer compositions surprisingly may benefit from the use of specific zinc compounds. In particular, the use of zinc compounds prone to forming ionic zinc (e.g., $Zn^{2+}$) may increase the antiviral properties of the polymer composition. It is theorized that the ionic zinc disrupts the replicative cycle of the virus. For example, the ionic zinc may interfere with (e.g., inhibit) viral protease or polymerase activity. Further discussion of the effect of ionic zinc on viral activity is found in Velthuis et al., *Zn Inhibits Coronavirus and Arterivirus RNA Polymerase Activity In Vitro and Zinc Ionophores Block the Replication of These Viruses in Cell Culture*, PLoS Pathogens (November 2010), which is incorporated herein by reference.

The amount of the zinc compound present in the polymer compositions may be discussed in relation to the ionic zinc content. In one embodiment, the polymer composition comprises ionic zinc, e.g., $Zn^{2+}$, in an amount ranging from 1 ppm to 30,000 ppm, e.g., from 1 ppm to 25,000 ppm, from 1 ppm to 20,000 ppm, from 1 ppm to 15,000 ppm, from 1 ppm to 10,000 ppm, from 1 ppm to 5,000 ppm, from 1 ppm to 2,500 ppm, from 50 ppm to 30,000 ppm, from 50 ppm to 25,000 ppm, from 50 ppm to 20,000 ppm, from 50 ppm to 15,000 ppm, from 50 ppm to 10,000 ppm, from 50 ppm to 5,000 ppm, from 50 ppm to 2,500 ppm, from 100 ppm to 30,000 ppm, from 100 ppm to 25,000 ppm, from 100 ppm to 20,000 ppm, from 100 ppm to 15,000 ppm, from 100 ppm to 10,000 ppm, from 100 ppm to 5,000 ppm, from 100 ppm to 2,500 ppm, from 150 ppm to 30,000 ppm, from 150 ppm to 25,000 ppm, from 150 ppm to 20,000 ppm, from 150 ppm to 15,000 ppm, from 150 ppm to 10,000 ppm, from 150 ppm to 5,000 ppm, from 150 ppm to 2,500 ppm, from 250 ppm to 30,000 ppm, from 250 ppm to 25,000 ppm, from 250 ppm to 20,000 ppm, from 250 ppm to 15,000 ppm, from 250 ppm to 10,000 ppm, from 250 ppm to 5,000 ppm, from 250 ppm to 2,500 ppm, from 500 ppm to 10000 wppm, from 1000 ppm to 7000 wppm, or from 3000 ppm to 5000 wppm. In some cases, the ranges and limits mentioned above for zinc may also be applicable to ionic zinc content.

In some cases, the use of zinc provides for processing and or end use benefits. Other antiviral agents, e.g., copper or silver, may be used, but these often include adverse effects (e.g., on the relative viscosity of the polymer composition, toxicity, and health or environmental risk). In some situations, the zinc does not have adverse effects on the relative viscosity of the polymer composition. Also, the zinc, unlike other antiviral agents, e.g., silver, does not present toxicity issues (and in fact may provide health advantages, such as immune system support). In addition, as noted herein, the use of zinc provides for the reduction or elimination of leaching into other media and/or into the environment. This both prevents the risks associated with introducing zinc into the environment and allows the polymer composition to be reused—zinc provides surprising "green" advantages over conventional, e.g., silver-containing, compositions.

Phosphorus Compound

The polymer composition may comprise phosphorus (in a phosphorus compound), e.g., phosphorus or a phosphorus compound is dispersed within the polymer composition. In one embodiment, the polymer composition comprises phosphorus in an amount ranging from 50 wppm to 10000 wppm, e.g., from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 10000 wppm, 200 wppm to 5000 wppm, from 200 wppm to 2500 wppm, from 200 ppm to 800 wppm, from 300 wppm to 10000 wppm, from 300 wppm to 5000 wppm, from 300 wppm to 2500 wppm, from 300 wppm to 500 wppm, from 500 wppm to 10000 wppm, from 500 wppm to 5000 wppm, or from 500 wppm to 2500 wppm. In terms of lower limits, the polymer composition may comprise greater than 50 wppm of phosphorus, e.g., greater than 75 wppm, greater than 100 wppm, greater than 150 wppm, greater than 200 wppm greater than 300 wppm or greater than 500 wppm. In terms of upper limits, the polymer composition may comprise less than 10000 wppm (or 1 wt. %), e.g., less than 5000 wppm, less than 2500 wppm, less than 2000 wppm, less than 1800 wppm, less than 1500 wppm, less than 1000 wppm, less than 800 wppm, less than 750 wppm, less than 500 wppm, less than 475 wppm, less than 450 wppm, less than 400 wppm, less than 350 wppm, less than 300 wppm, less than 250 wppm, less than 200 wppm, less than 150 wppm, less than 100 wppm, less than 50 wppm, less than 25 wppm, or less than 10 wppm.

In some aspects, the phosphorus or the phosphorus compound is embedded in the polymer formed from the polymer composition. As noted above, because of the overall makeup of the disclosed composition low amounts, if any, phosphorus may be employed, which in some cases may provide for advantageous performance results (see above).

The phosphorus of the polymer composition is present in or provided via a phosphorus compound, which may vary widely. The phosphorus compound may comprise bezene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylrnethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the phosphorus to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to phosphorus in the polymer composition may be less than 15:1, e.g., less than 10:1, less than 9:1, less than 8:1, less than 7:1, less than 6:1, less than 5:1, less than 4:1, or less than 3:1. In some cases, phosphorus is bound in the polymer matrix along with zinc.

In one embodiment, the weight ratio of zinc to phosphorus in the polyamide composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, or less than 15:1. In some aspects, there is no phosphorus in the polyamide composition. In other aspects, a very low amount of phosphorus is present. In some cases, phosphorus is held in the polymer matrix along with zinc.

In one embodiment, the weight ratio of zinc to phosphorus in the polyamide composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide composition may be greater than 0.001:1, e.g., greater than 0.005:1, greater than 0.01:1, greater than 0.05:1, greater than 0.1:1, greater than 0.15:1, or greater than 0.2:1.

Advantageously, it has been discovered that adding the above identified zinc compounds and phosphorus compounds may result in a beneficial relative viscosity (RV) of the polymer composition. In some embodiments, the RV of the polymer composition ranges from 5 to 80, e.g., from 5 to 70, from 10 to 70, from 15 to 65, from 20 to 60, from 30 to 50, from 10 to 35, from 10 to 20, from 60 to 70, from 50 to 80, from 40 to 50, from 30 to 60, from 5 to 30, or from 15 to 32. In terms of lower limits, the RV of the polymer composition may be greater than 5, e.g., greater than 10, greater than 15, greater than 20, greater than 25, greater than 27.5, or greater than 30. In terms of upper limits, the RV of the polymer composition may be less than 70, e.g., less than 65, less than 60, less than 50, less than 40, or less than 35.

To calculate RV, a polymer may be dissolved in a solvent (usually formic or sulfuric acid), the viscosity is measured, then the viscosity is compared to the viscosity of the pure solvent. This give a unitless measurement. Solid materials, as well as liquids, may have a specific RV. The products produced from the polymer compositions may have the aforementioned relative viscosities, as well.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded, molded or otherwise drawn, into various products (e.g., high-contact products, surface layers of high-contact products) by conventional methods to produce products having substantially improved antimicrobial activity. The zinc and phosphorus are employed in the polymer composition in the aforementioned amounts to provide a belt with improved antimicrobial activity retention (near-permanent).

Copper Compound

As noted above, the polymer composition, in some embodiments, includes copper (provided via a copper compound). As used herein, "copper compound" refers to a compound having at least one copper molecule or ion.

In some cases, the copper compound may improve, e.g., enhance the antiviral properties of the polymer composition. In some cases, the copper compound may affect other characteristics of the polymer composition, e.g., antimicrobial activity or physical characteristics.

The polymer composition may comprise copper (e.g., in a copper compound), e.g., copper or a copper compound, dispersed within the polymer composition. In one embodiment, the polymer composition comprises copper in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 5 wppm to 100 wppm, from 5 wppm to 50 wppm, from 5 wppm to 35 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm.

In terms of lower limits, the polymer composition may comprise greater than 5 wppm of copper, e.g., greater than 10 wppm, greater than 50 wppm, greater than 100 wppm, greater than 200 wppm, or greater than 300 wppm. In terms of upper limits, the polymer composition may comprise less than 20,000 wppm of copper, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, less than 500 wppm less than 100 wppm, less than 50 wppm, less than 35 wppm. In some aspects, the copper compound is embedded in the polymer formed from the polymer composition.

The composition of the copper compound is not particularly limited. Suitable copper compounds include copper iodide, copper bromide, copper chloride, copper fluoride, copper oxide, copper stearate, copper ammonium adipate, copper acetate, or copper pyrithione, or combinations thereof. The copper compound may comprise copper oxide, copper ammonium adipate, copper acetate, copper ammonium carbonate, copper stearate, copper phenyl phosphinic acid, or copper pyrithione, or combinations thereof. In some embodiments, the copper compound comprises copper oxide, copper ammonium adipate, copper acetate, or copper pyrithione, or combinations thereof. In some embodiments, the copper compound comprises copper oxide, copper stearate, or copper ammonium adipate, or combinations thereof. In some aspects, the copper is provided in the form of copper oxide. In some aspects, the copper is not provided via copper phenyl phosphinate and/or copper phenyl phosphonate.

In some cases, the polymer composition includes silver (optionally provided via a silver compound). As used herein, "silver compound" refers to a compound having at least one silver molecule or ion. The silver may be in ionic form. The ranges and limits for silver may be similar to the ranges and limits for copper (discussed above).

In one embodiment, the molar ratio of the copper to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the copper to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to copper in the polymer composition may be less than 15:1, e.g., less than 10:1, less than 9:1, less than 8:1, less than 7:1, less than 6:1, less than 5:1, less than 4:1, or less than 3:1. In some cases, copper is bound in the polymer matrix along with zinc.

In some embodiments, the use of cuprous ammonium adipate has been found to be particularly effective in activating copper ions into the polymer matrix. Similarly, the use of silver ammonium adipate has been found to be particularly effective in activating silver ions into the polymer matrix. It is found that dissolving copper (I) or copper (II) compounds in ammonium adipate is particularly efficient at generating copper (I) or copper (II) ions. The same is true for dissolving Ag (I) or Ag (III) compounds in ammonium adipate to generate Ag1+ or Ag$^{3+}$ ions.

Additives

In addition to the polymer and zinc components, the polymer compositions may further comprise molding additives, which are generally not employed when preparing a polymer composition for spinning and blowing methods for fiber production.

Impact Modifier

The polyamide compositions disclosed herein include one or more impact modifiers. The inventors have found that these impact modifiers beneficially can be an elastomeric or rubbery material selected to have good interaction and compatibility with, and dispersion among, the one or more polyamide polymers of the composition. The impact modifier can include a styrenic copolymer such as an acrylate-butadiene-styrene or a methyl methacrylate-butadiene-styrene. The impact modifier can include an acrylic polymer or a polyethylene polymer such as a chlorinated polyethylene.

In some embodiments, the impact modifier includes an ethylene-octene copolymer. In some cases, the combination of the impact modifier and the melt stabilizers (optionally in the disclosed amounts and ratios) provides for surprising, synergistic combinations of performance features, e.g., tensile/flexural performance and impact resistance.

In some embodiments, the partial layer comprises impact modifier, e.g., to provide performance features.

In some cases, the impact modifier comprises olefins, acrylates, or acrylics, or combinations thereof, including polymers of these compounds such as polyolefins or polyacrylates. These compounds may be modified, e.g., modified (grafted) with maleic anhydride. In some embodiments, the impact modifier comprises a maleic anhydride-modified olefin, acrylate, or acrylic, or combinations thereof. In some cases, the impact modifier comprises a modified olefin, e.g., a maleic anhydride-modified olefin. The impact modifier may comprise a maleic anhydride-modified ethylene octene and/or ethylene acrylate.

In some embodiments, the impact modifier has a glass transition temperature ranging from ranging from 0° C. to −100° C., e.g., from −5° C. to −80° C., −10° C. to −70° C., −20° C. to −60° C., or from −25° C. to −55° C. In terms of lower limits, the impact modifier may have a glass transition temperature greater than −100° C., e.g., greater than −80° C., greater than −70° C., greater than −60° C., or greater than −55° C. In terms of upper limits, the impact modifier may have a glass transition temperature less than 0° C., e.g., less than −5° C., less than −10° C., less than −15° C., or less than −25° C. It is believed that impact modifiers having such glass transition temperatures synergistically improve energy dissipation characteristics, e.g., impact resistance. These particular impact modifiers have glass transition temperatures in temperature ranges that work with the disclosed polyamides and glass fibers to achieve improved impact performance, especially in the desired temperature ranges, e.g., −10° C. to −70° C.

The concentration of the impact modifier in the polyamide composition can, for example, range from 3 wt % to 30 wt %, e.g., from 2 wt % to 25 wt %, from 2 wt % to 20 wt %, from 5.7 wt % to 21.9 wt %, from 4.0 wt % to 15 wt %, from 5.5 wt % to 14 wt %, from 6.0 wt % to 11.5 wt %, from 8.4 wt % to 24.6 wt %, from 11.1 wt % to 27.3 wt %, or from 13.8 wt % to 30 wt %. In some embodiments, the concentration of the impact modifier ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 15 wt %, less than 14 wt %, less than 14.4 wt %, less than 13 wt %, less than 11.6 wt %, less than 11.5 wt %, less than 10.2 wt %, less than 8.8 wt %, less than 7.4 wt %, less than 6 wt %, or less than 5.4 wt %. In terms of lower limits, the impact modifier concentration can be greater than 3 wt %, greater than 4.0 wt %, greater than 5.5 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

The weight ratio of the one or more polyamide polymers to the impact modifier in the polyamide composition can, for example, range from 0.2 to 30, e.g., from 0.2 to 4, from 0.33 to 6.7, from 2 to 7, from 3 to 6, 1 to 15, from 5 to 15, from 2 to 12, from 0.54 to 11, from 0.9 to 18, or from 1.5 to 30. In terms of upper limits, the weight ratio of the one or more polyamide polymers to the impact modifier can be less than 30, e.g., less than 18, less than 15, less than 12, less than 11, less than 7, less than 6, less than 6.7, less than 4, less than 2.4, less than 1.5, less than 0.9, less than 0.54, or less than 0.33. In terms of lower limits, the weight ratio of the one or more polyamide polymers to the impact modifier can be greater than 0.2, e.g., greater than 0.33, greater than 0.55, greater than 0.9, greater than 1.5, greater than 2, greater than 2.4, greater than 3, greater than 5, greater than 6.7, greater than 11, or greater than 18. Lower ratios, e.g., less than 0.2, and higher ratios, e.g., greater than 30, are also contemplated.

Heat Stabilizer

The one or more heat stabilizers of the polyamide composition can be selected to improve performance, e.g., at higher operating temperatures, of the composition without significantly negatively affecting the strength or ductility of the material. The heat stabilizer can include, for example, hindered phenolic stabilizers, phosphite-based stabilizers, hindered amine-based stabilizers, triazine-based stabilizers, sulfur-based stabilizers, copper stabilizers, or combinations thereof.

Examples of hindered phenolic stabilizers include N,N'-hexane-1,6-diylbis[3-(3,5-ditert-butyl-4-hydroxyphenylpropionamide)]; pentaerythrityl-tetrakis[3-(3,5-di-tert-butyl-4-hydroxyphenyl)propionate]; N,N'-hexamethylene bis(3,5-di-tert-butyl-4-hydroxyhydrocinnamamide); triethyleneglycol-bis [3-(3-tert-butyl-5-methyl-4-hydroxyphenyl) propionate]; 3,9-bis{2-[3-(3-tert-butyl-4-hydroxy-5-methylphenyl)propionyloxy]-1,1-dimethylethyl}-2,4,8, 10-tetraoxaspiro[5,5]undecane; 3,5-di-tert-butyl-4-hydroxybenzyl phos phonate-diethyl ester; 1,3,5-trimethyl-2,4,6-tris(3,5-ditert-butyl-4-hydroxybenzyl)benzene; and 1,3,5-tris(4-tert-butyl-3-hydroxy-2,6-dimethylbenzyl)isocyanurate.

Examples of phosphite-based stabilizers include trioctyl phosphite; trilauryl phosphite; tridecyl phosphite; octyldiphenyl phosphite; trisisodecyl phosphite; phenyl diisodecyl phosphite; phenyl di(tridecyl)phosphite; diphenyl isooctyl phosphite; diphenyl isodecyl phosphite; diphenyl(tridecyl) phosphite; triphenyl phosphite; tris(nonyl phenyl) phosphite; tris(2,4-di-tert-butyl phenyl) phosphite; tris(2,4-di-tert-butyl-5-methyl phenyl) phosphite; tris(butoxyethyl) phosphite; 4,4'-butylidene-bis(3-methyl-6-tertbutylphenyl-tetra-tridecyl)diphosphite; tetra(C12- to C15-mixed alkyl)-4,4'-isopropylidenediphenyl diphosphite; 4,4'-isopropylidenebis(2-tert-butylphenyl)-di(nonylphenyl) phosphite; tris(biphenyl)phosphite; tetra(tridecyl)-1,1,3-tris (2-methyl-5-tertbutyl-4-hydroxyphenyl)butane diphosphite; tetra(tridecyl)-4,4'-butylidenebis(3-methyl-6-tert-butylphenyl)diphosphite; tetra($C_1$- to $C_{15}$-mixed alkyl)-4,4'-isopropylidenediphenyl diphosphite; tris(mono-/di-mixed nonylphenyl)phosphite; 4,4'-isopropylidenebis(2-tertbutylphenyl)-di(nonylphenyl)phosphite; 9,10-di-hydro-9-oxa-10-phosphorphenanthrene-10-oxide; tris(3,5-di-t-butyl-4-hydroxyphenyl)phosphite; hydrogenated-4,4'-isopropylidenediphenyl polyphosphite; bis(octylphenyl)-bis (4,4'-butylidenebis(3-methyl-6-tert-butyl phenyl)-1,6-hexanol diphosphite; hexa(tridecyl)-1,1,3-tris(2-methyl-4-hydroxy-5-tert-butylphenyl)butane triphosphite; tris(4,4'-isopropylidenebis(2-tertbutylphenyl) phosphite; tris(1,3- stearoyloxyisopropyl)phosphite; 2,2-methylenebis(4,6-ditert-butylphenyl)octyl phosphite; 2,2-methylenebis(3-methyl-4,6-di-tert-butylphenyl)-2-ethylhexyl phosphite; tetrakis(2,4-di-tert-butyl-5-methylphenyl)-4,4'-biphenylene diphosphite; and tetrakis(2,4-di-tert-butyl phenyl)-4,4'-biphenylene diphosphite.

Phosphite-based stabilizers also include pentaerythritol-type phosphite compounds, such as 2,6-di-tert-butyl-4-methylphenyl-phenyl-pentaerythritol diphosphite; 2,6-di-tert-butyl-4-methylphenyl-methyl-pentaerythritol diphosphite; 2,6-di-tert-butyl-4-methylphenyl-2-ethylhexyl-pentaerythritol diphosphite; 2,6-di-tert-butyl-4-methylphenylisodecyl-pentaerythritol diphosphite; 2,6-di-tert-butyl-4-methylphenyl-laurylpentaerythritol diphosphite; 2,6-di-tert-butyl-4-methylphenyl-isotridecyl-pentaerythritol diphosphite; 2,6-di-tert-butyl-4-methyl phenyl-stearyl-pentaerythritol diphosphite; 2,6-ditert-butyl-4-methyl phenyl-cyclohexyl-pentaerythritol diphosphite; 2,6-di-tert-butyl-4-methylphenyl-benzyl-pentaerythritol diphosphite; 2,6-di-tert-butyl-4-methylphenyl-ethylcellosolve-pentaerythritol diphosphite; 2,6-di-tert-butyl-4-methylphenyl-butylcarbitol-pentaerythritol diphosphite; 2,6-di-tert-butyl-4-methylphenyl-octylphenyl-pentaerythritol diphosphite; 2,6-di-tert-butyl-4-methylphenyl-nonylphenyl-pentaerythritol diphosphite; bis(2,6-di-tert-butyl-4-methyl phenyl)pentaerythritol diphosphite; bis(2,6-di-tert-butyl-4-ethylphenyl) pentaerythritol diphosphite; 2,6-di-tert-butyl-4-methylphenyl-2,6-di-tertbutylphenyl-pentaerythritol diphosphite; 2,6-di-tert-butyl-4-methylphenyl-2,4-di-tertbutylphenyl-pentaerythritol diphosphite; 2,6-di-tert-butyl-4-methylphenyl-2,4-di-tertoctylphenyl-pentaerythritol diphosphite; 2,6-di-tert-butyl-4-methylphenyl-2-cyclohexylphenyl-pentaerythritol diphosphite; 2,6-di-tert-amyl-4-methylphenyl-phenyl-pentaerythritol diphosphite; bis(2,6-di-tert-amyl-4-methylphenyl)pentaerythritol diphosphite; and bis(2,6-di-tert-octyl-4-methylphenyl)pentaerythritol diphosphite.

Examples of hindered amine-based stabilizers include 4-acetoxy-2,2,6,6-tetra methyl piperidine; 4-stearoyloxy-2,2,6,6-tetramethylpiperidine; 4-acryloyloxy-2,2,6,6-tetramethylpiperidine; 4-(phenylacetoxy)-2,2,6,6-tetramethylpiperidine; 4-benzoyloxy-2,2,6,6-tetramethylpiperidine; 4-methoxy-2,2,6,6-tetramethylpiperidine; 4-stearyloxy-2,2,6,6-tetramethylpiperidine; 4-cyclohexyloxy-2,2,6,6-tetra methylpiperidine; 4-benzyloxy-2,2,6,6-tetramethylpiperidine; 4-phenoxy-2,2,6,6-tetramethylpiperidine; 4-(ethylcarbamoyloxy)-2,2,6,6-tetramethylpiperidine; 4-(cyclohexylcarbamoyloxy)-2,2,6,6-tetramethylpiperidine; 4-(phenylcarbamoyloxy)-2,2,6,6-tetramethylpiperidine; bis(2,2,6,6-tetramethyl-4-piperidyl)-carbonate; bis(2,2,6,6-tetramethyl-4-piperidyl)-oxalate; bis(2,2,6,6-tetramethyl-4-piperidyl)-malonate; bis(2,2,6,6-tetramethyl-4-piperidyl)-sebacate; bis(2,2,6,6-tetramethyl-4-piperidyl)-adipate; bis(2,2,6,6-tetramethyl-4-piperidyl)terephthalate; 1,2-bis(2,2,6,6-tetramethyl-4-piperidyloxy)-ethane; α,α'-bis(2,2,6,6-tetramethyl-4-piperidyloxy)-p-xylene; bis(2,2,6,6-tetramethyl-4-piperidyl)-tolylene-2,4-dicarbamate; bis(2,2,6,6-tetra methyl-4-piperidyl)-hexamethylene-1,6-dicarbamate; tris(2,2,6,6-tetramethyl-4-piperidyl)-benzene-1,3,5-tricarboxylate; tris(2,2,6,6-tetramethyl-4-piperidyl)-benzene-1,3,4-tricarboxylate; 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine; and a condensation product of 1,2,3,4-butanetetracarboxylic acid; 1,2,2,6,6-pentamethyl-4-piperidinol; and β,β,β',β'-tetramethyl-3,9-[2,4,8,10-tetraoxaspiro(5,5)undecane]diethanol.

Examples of triazine-based stabilizers include 2,4,6-tris (2'-hydroxy-4'-octyloxy-phenyl)-1,3,5-triazine; 2-(2'-hydroxy-4'-hexyloxy-phenyl)-4,6-diphenyl-1,3,5-triazine; 2-(2'-hydroxy-4'-octyloxyphenyl)-4,6-bis(2',4-dimethylphenyl)-1,3,5-triazine; 2-(2',4'-dihydroxyphenyl)-4,6-bis(2',4'-dimethylphenyl)-1,3,5-triazine; 2,4-bis(2'-hydroxy-4'-propyloxy-phenyl)-6-(2',4'-dimethylphenyl)-1,3,5-triazine; 2-(2-hydroxy-4-octyloxyphenyl)-4,6-bis(4'-methylphenyl)-1,3,5-triazine; 2-(2'-hydroxy-4'-dodecyloxyphenyl)-4,6-bis (2',4'-dimethylphenyl)-1,3,5-triazine; 2,4,6-tris(2'-hydroxy-4'-isopropyloxyphenyl)-1,3,5-triazine; 2,4,6-tris(2'-hydroxy-4'-n-hexyloxyphenyl)-1,3,5-triazine; and 2,4,6-tris (2'-hydroxy-4'-ethoxycarbonylmethoxyphenyl)-1,3,5-triazine.

Copper stabilizers include copper halides, e.g., chlorides, bromides, iodides. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, and copper complex salts coordinated to a chelating amine such as ethylenediamine and ethylenediaminetetraacetic acid.

In some embodiments, the heat stabilizers comprise a copper-containing heat stabilizer. In some embodiments, the first copper-containing heat stabilizer comprises copper, a halogen, (or a copper halide—a compound containing copper and a halogen), and optionally an organohalo-phosphorus (organobromine-phosphorus) compound. In some aspects, the first copper-containing heat stabilizer comprises a mixture including copper halides, phosphates, or phosphines, or complexes thereof. In some aspects, the first copper-containing heat stabilizer comprises a complex including copper iodide, bis(triphenylphosphine), and tris (tribromoneopentyl)phosphate. Suitable first copper-containing heat stabilizers include those described in German Patent No. DE19847626, which is incorporated by reference in its entirety.

These copper halide and organohalo-phosphorus (organobromine-phosphorus) compound combinations, when added to the polyamides described herein, result in polyamide compositions that exhibit superior heat stability while also maintaining excellent electrical properties, thus making the polyamide compositions of the present invention ideally suited for use in the electrical/electronic industries. As a further benefit, this combination of a copper halide and an organophosphorus compound does not discolor the polyamide composition. Suitable commercial (first) copper-containing heat stabilizers include BRUGGOLEN® H3386 (available from Bruggemann Chemical).

In some embodiments, the polyamide composition includes a cerium-based heat stabilizer, e.g., cerium oxide, cerium hydrate, and/or cerium oxyhydrate.

The concentration of the heat stabilizer in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.1 wt % to 3 wt %, from 0.15 wt % to 1 wt %, from 0.32 wt % to 3.4 wt %, or from 0.48 wt % to 5 wt %. In some embodiments, the concentration of the heat stabilizer ranges from 0.2 wt % to 0.7 wt %. In terms of upper limits, the heat stabilizer concentration can be less than 5 wt %, e.g., less than 3.4 wt %, less than 3 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In terms of lower limits, the heat stabilizer concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the heat stabilizer comprises copper or a copper-containing compound such as, for example, copper iodide. After combining the heat stabilizer with the other polyamide composition components, the concentration of copper in the polyamide composition can, for example, range from 25 ppm to 700 ppm, e.g., from 25 ppm to 180 ppm, from 35 ppm to 260 ppm, from 49 ppm to 360 ppm, from 68 ppm to 500 ppm, or from 95 ppm to 700 ppm. In terms of upper limits, the concentration of copper in the polyamide composition can be less than 700 ppm, e.g., less than 500 ppm, less than 360 ppm, less than 260 ppm, less than 180 ppm, less than 130 ppm, less than 95 ppm, less than 68 ppm, less than 49 ppm, or less than 35 ppm. In terms of lower limits, the concentration of copper in the polyamide composition can be greater than 25 ppm, e.g., greater than 35 ppm, greater than 49 ppm, greater than 68 ppm, greater than 95 ppm, greater than 130 ppm, greater than 180 ppm, greater than 260 ppm, greater than 360 ppm, or greater than 500 ppm. Higher concentrations, e.g., greater than 700 ppm, and lower concentrations, e.g., less than 25 ppm, are also contemplated.

The weight ratio of the one or more polyamides to the heat stabilizer in the polyamide composition can, for example, range from 1 to 850, e.g., from 1 to 57, from 2 to 110, from 3.9 to 220, from 7.6 to 430, or from 15 to 850. In terms of upper limits, the weight ratio of the one or more polyamide polymers to the heat stabilizer can be less than 850, e.g., less than 430, less than 220, less than 110, less than 29, less than 57, less than 15, less than 7.6, less than 3.9, or less than 2. In terms of lower limits, the weight ratio of the one or more polyamide polymers to the heat stabilizer can be greater than 1, e.g., greater than 2, greater than 3.9, greater than 7.6, greater than 15, greater than 29, greater than 57, greater than 110, greater than 220, or greater than 430. Lower ratios, e.g., less than 1, and higher ratios, e.g., greater than 850, are also contemplated.

The weight ratio of the impact modifier to the heat stabilizer in the polyamide composition can, for example, range from 0.5 to 300, e.g., from 0.5 to 23, from 0.95 to 44, from 1.8 to 83, from 10 to 40 from 12 to 35, from 3.4 to 160, or from 6.5 to 300. In terms of upper limits, the weight ratio of the impact modifier to the heat stabilizer can be less than 300, e.g., less than 160, less than 83, less than 44, less than 40, less than 35, less than 23, less than 12, less than 6.5, less than 3.4, less than 1.8, or less than 0.95. In terms of lower limits, the weight ratio of the impact modifier to the heat stabilizer can be greater than 0.5, e.g., greater than 0.95, greater than 1.8, greater than 3.4, greater than 6.5, greater than 10, greater than 12, greater than 23, greater than 44, greater than 83, or greater than 160. Lower ratios. e.g., less than 0.5, and higher ratios, e.g., greater than 300, are also contemplated.

Color Package (Nigrosine/Carbon Black)

The polyamide composition can include one or more soluble dyes such as nigrosine or solvent black 7. The concentration of the nigrosine in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.32 wt % to 3.4 wt %, or from 0.48 wt % to 5 wt %. In some embodiments, the concentration of the nigrosine ranges from 1 wt % to 2 wt %, e.g., from 1 wt % to 1.6 wt %, from 1.1 wt % to 1.7 wt %, from 1.2 wt % to 1.8 wt %, from 1.3 wt % to 1.9 wt %, or from 1.4 wt % to 2 wt %. In terms of upper limits, the nigrosine concentration can be less than 5 wt %, e.g., less than 3.4 wt %, less than 2.3 wt %, less than 2 wt %, less than 1.9 wt %, less than 1.8 wt %, less than 1.7 wt %, less than 1.6 wt %, less than 1.5 wt %, less than 1.4 wt %, less than 1.3 wt %, less than 1.2 wt %, less than 1.1 wt %, less than 1 wt %, less than 0.71 wt %, less than 0.48 wt %, less than 0.32 wt %, less than 0.22 wt %, or less than 0.15 wt %. In terms of lower limits, the nigrosine concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.1 wt %, greater than 1.2 wt %, greater than 1.3 wt %, greater than 1.4 wt %, greater than 1.5 wt %, greater than 1.6 wt %, greater than 1.7 wt %, greater than 1.8 wt %, greater than 1.9 wt %, greater than 2 wt %, greater than 2.3 wt %, or greater than 3.4 wt %. Lower concentrations, e.g., less than 0.1 wt %, and higher concentrations, e.g., greater than 5 wt %, are also contemplated. In some cases, the nigrosine is provided in a masterbatch, and the concentration of the nigrosine in the masterbatch and in the resultant composition can be easily calculated.

The weight ratio of the one or more polyamide polymers to the nigrosine in the polyamide composition can, for example, range from 1 to 85, e.g., from 1 to 14, from 1.6 to 22, from 2.4 to 35, from 3.8 to 55, or from 5.9 to 85. In terms of upper limits, the ratio of the one or more polyamide polymers to the nigrosine can be less than 85, e.g., less than 55, less than 35, less than 22, less than 14, less than 9.2, less than 5.9, less than 3.8, less than 2.4, or less than 1.6. In terms of lower limits, the ratio of the one or more polyamide polymers to the nigrosine can be greater than 1, e.g., greater than 1.6, greater than 2.4, greater than 3.8, greater than 5.9, greater than 9.2, greater than 14, greater than 22, greater than 35, or greater than 55. Higher ratios, e.g., greater than 55, and lower ratios, e.g., less than 1, are also contemplated.

The weight ratio of glass fiber to the nigrosine in the polyamide composition can, for example, range from 2 to 60, e.g., from 2 to 15, from 2.8 to 22, from 3.9 to 30, from 5.5 to 43, or from 7.8 to 60. In terms of upper limits, the ratio of glass fiber to the nigrosine can be less than 60, e.g., less than 43, less than 30, less than 22, less than 15, less than 11, less than 7.8, less than 5.5, less than 3.9, or less than 2.8. In terms of lower limits, the ratio of glass fiber to the nigrosine can be greater than 2, e.g., greater than 2.8, greater than 3.9, greater than 5.5, greater than 7.8, greater than 11, greater than 15, greater than 22, greater than 30, or greater than 43. Higher ratios, e.g., greater than 60, and lower ratios, e.g., less than 2, are also contemplated.

The weight ratio of the heat stabilizer to the nigrosine in the polyamide composition can, for example, range from 0.02 to 5, e.g., from 0.02 to 0.55, from 0.035 to 0.95, from 0.06 to 1.7, from 0.1 to 2.9, or from 0.18 to 5. In terms of upper limits, the ratio of the heat stabilizer to the nigrosine can be less than 5, e.g., less than 2.9, less than 1.7, less than 0.95, less than 0.55, less than 0.32, less than 0.18, less than 0.1, less than 0.06, or less than 0.035. In terms of lower limits, the ratio of the heat stabilizer to the nigrosine can be greater than 0.02, e.g., greater than 0.035, greater than 0.06, greater than 0.1, greater than 0.18, greater than 0.32, greater than 0.55, greater than 0.95, greater than 1.7, or greater than 2.9. Higher ratios, e.g., greater than 5, and lower ratios, e.g., less than 0.02, are also contemplated.

The polyamide composition can include one or more pigments such as carbon black. The concentration of the carbon black in the polyamide composition can, for example, range from 0.1 to 5 wt %, e.g., from 0.1 wt % to 1.05 wt %, from 0.15 wt % to 1.55 wt %, from 0.22 wt % to 2.29 wt %, from 0.32 wt % to 3.38 wt %, or from 0.48 wt % to 5 wt %. In some embodiments, the concentration of the carbon black ranges from 0.2 wt % to 0.8 wt %. In terms of upper limits, the carbon black concentration can be less than 5 wt %, e.g., less than 3.4 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In some embodiments, the concentration of the carbon black is less than 3 wt %. In terms of lower limits, the carbon black concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

Melt Stabilizer

The polyamide composition can include one or more melt stabilizers (lubricants). The type and relative amount of melt stabilizer can be selected to improve processing of the composition, and to contribute to the simultaneously high strength and ductility of the material. The concentration of the melt stabilizer in the polyamide composition can, for example, range from 0.05 wt % to 5 wt %, e.g., from 0.05 wt % to 3 wt %, from 0.1 wt % to 0.6 wt %, from 0.2 wt % to 0.7 wt %, from 0.3 wt % to 0.8 wt %, from 0.1 wt % to 3 wt %, from 0.4 wt % to 0.9 wt %, from 0.5 wt % to 1 wt %, from 0.15 wt % to 1.5 wt %, from 0.22 wt % to 2.3 wt %, from 0.32 wt % to 3.4 wt %, or from 0.48 wt % to 5 wt %. In terms of upper limits, the melt stabilizer concentration can be less than 5 wt %, e.g., less than 3.4 wt %, less than 2.3 wt %. less than 1.5 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %. In terms of lower limits, the melt stabilizer concentration can be greater than 0.1 wt %, e.g., greater than 0.2 wt %, greater than 0.3 w %, greater than 0.4 wt %, greater than 0.5 wt %, greater than 0.6 wt %, greater than 0.7 wt %, greater than 0.8 wt %, greater than 0.9 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the melt stabilizer comprises a saturated fatty acid. For example the melt stabilizer may comprise stearic acid, or behenic acid, or combinations thereof, or salts thereof. In some cases, the melt stabilizer comprises a stearate. The melt stabilizer, in some cases can include, for example, calcium stearate, aluminum distearate, zinc stearate, calcium stearate, N,N' ethylene bis-stearamide, stearyl erucamide. In some cases, the melt stabilizer comprises stearic acid. In some cases the zinc stearate (or zinc borate (see below)) is not considered the zinc AM/AV compound.

In some embodiments, the melt stabilizer does not include an ionic lubricant. In addition to other performance improvements, the disclosed melt stabilizers, also significantly improve dispersion of the components in the matrix of the polymer, e.g., the dispersion of the impact modifiers in the polyamide matrix.

In some embodiments, the melt stabilizer may be a wax. In some embodiments, the melt stabilizer consists of a wax. In some embodiments, the wax includes a fatty acid. In some embodiments, the melt stabilizer consists of a fatty acid. In some embodiments, the wax includes a saturated fatty acid. In some embodiments, the melt stabilizer consists of a saturated fatty acid. In some embodiments, the wax includes stearic acid, behenic acid, or salts or combinations thereof. In some embodiments, the wax consists of stearic acid, behenic acid, or salts or combinations thereof.

In addition to other performance improvements, the disclosed melt stabilizers, also significantly improve dispersion of the components in the matrix of the polymer, e.g., the dispersion of the impact modifiers in the polyamide matrix, which beneficially improves impact performance.

The concentration of the melt stabilizer, e.g., stearic acid or salt thereof, in the polyamide composition can, for example, range from 0.03 wt % to 4 wt %, e.g., from 0.03 wt % to 0.57 wt %, from 0.05 wt % to 0.92 wt %, from 0.08 wt % to 1.5 wt %, from 0.13 wt % to 2.5 wt %, or from 0.21 wt % to 4 wt %. In terms of upper limits, the stearic acid or salt concentration can be less than 4 wt %, e.g., less than 2.4 wt %, less than 1.5 wt %, less than 0.92 wt %, less than 0.57 wt %, less than 0.35 wt %, less than 0.21 wt %, less than 0.13 wt %, less than 0.08 wt %, or less than 0.05 wt %. In terms of lower limits, the stearic acid or salt concentration can be greater than 0.03 wt %, e.g., greater than 0.05 wt %, greater than 0.08 wt %, greater than 0.13 wt %, greater than 0.21 wt %, greater than 0.35 wt %, greater than 0.57 wt %, greater than 0.92 wt %, greater than 1.5 wt %, or greater than 2.5 wt %. Higher concentrations, e.g., greater than 4 wt %, and lower concentrations, e.g., less than 0.03 wt %, are also contemplated.

The weight ratio of the impact modifier to the melt stabilizer in the polyamide composition can, for example, range from 1 to 100, e.g., from 2 to 50, from 5 to 50, from 10 to 40, from 10 to 35, from 5 to 25, from 10 to 20, from 10 to 50, from 20 to 40, or from 25 to 35. In terms of upper limits, the ratio of the impact modifier to the melt stabilizer can be less than 100, e.g., less than 75, less than 50, less than 40, less than 35, less than 25, or less than 20. In terms of lower limits, the ratio of the impact modifier to the melt stabilizer can be greater than 1, e.g., greater than 2, greater than 5, greater than 10, greater than 20, or greater than 25. Higher ratios are also contemplated.

As noted above, the combination of the impact modifier and the melt stabilizer leads to synergistic combinations of performance features. Generally, impact modifiers are known to have detrimental effects on tensile strength. For example a degradation in shear of the polymer is observed (shear is detrimentally increased and tensile performance is adversely affected). However, when the disclosed impact modifiers and melt stabilizers are used together, an unexpected balance is struck, the melt stabilizers reduce or eliminate the degradation. As a result, little or no loss in tensile performance is observed, while surprisingly impact resilience is significantly improved.

Flame Retardants

The flame retardant package may vary widely, and many suitable flame retardants are known. Examples of (bromine-containing) flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenyl)ethane, tetrabromobisphenol A epoxy resin (TBBA epoxy), tetrabromobisphenol A carbonate (TBBA-PC), ethylene(bistetrabromophthal)imide (EBTBPI), ethylenebispentabromodiphenyl, tris(tribromophenoxy)triazine (TTBPTA), bis(dibromopropyl)tetrabromobisphenol A (DBP-TBBA), bis(dibromopropyl)tetrabromobisphenol S (DBP-TBBS), brominated polyphenylene ethers (BrPPE) (such as poly(di)bromophenylene ether, etc.), brominated polystyrenes (BrPPE) (such as polydibromostyrenes, polytribromostyrenes, crosslinked brominated polystyrenes, etc.), brominated crosslinked aromatic polymers, brominated epoxy resins, brominated phenoxy resins, brominated styrene-maleic anhydride polymers, tetrabromobisphenol S (TBBS), tris(tribromoneopentyl)phosphate (TTBNPP), polybromotrimethylphenylindan (PBPI), and tris(dibromopropyl)-isocyanurate (TDBPIC).

Halogen-based flame retardants may also be used. Conventional flame retardant synergists include, but are not limited to, antimony oxides (such as diantimony trioxide, diantimony tetroxide, diantimony pentoxide and sodium antimonate), tin oxides (such as tin monoxide and tin dioxide), iron oxides (such as iron(II) oxide and γ-iron oxide), zinc oxide and zinc borate. Generally, non-halogenated flame retardants are used due to a desire to avoid the potentially adverse environmental impact of halogenated flame retardants.

Exemplary non-halogenated flame retardants include phosphorus- or melamine-containing flame retardants. Melamine flame retardants are known in the art and include melamine phosphates and melamine cyanurate. Phosphate esters are especially suitable for use. Such compounds include, for example, alkyl and aryl esters of phosphoric acid such as trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, di-iso-propylphenyl phosphate, trixylenyl phosphate, tris(iso-propylphenyl) phosphate, trinaphthyl phosphate, bisphenol A diphenyl phosphate, and resorcinol diphenyl phosphate. Commonly used triaryl phosphates include, for example, triphenyl phosphate (TPP), cresyl diphenyl phosphate, and tricresyl phosphate. Inorganic phosphate flame retardants such as ammonium polyphosphate (which acts as an intumescent flame retardant) may also be utilized.

Phosphinate flame retardants, including those sold under the Exolit® name, such as OP1230 and OP1400 may be used in the composition described herein. Phosphinate flame retardants may be desirable because of their anti-corrosive nature.

The concentration of the flame retardant in the polyamide composition can, for example, range from 3 wt % to 30 wt %, e.g., from 2 wt % to 25 wt %, from 2 wt % to 20 wt %, from 5.7 wt % to 21.9 wt %, from 4.0 wt % to 15 wt %, from 5.5 wt % to 14 wt %, from 6.0 wt % to 11.5 wt %, from 8.4 wt % to 24.6 wt %, from 11.1 wt % to 27.3 wt %, or from 13.8 wt % to 30 wt %. In some embodiments, the concentration of the flame retardant ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 15 wt %, less than 14 wt %, less than 14.4 wt %, less than 13 wt %, less than 11.6 wt %, less than 11.5 wt %, less than 10.2 wt %, less than 8.8 wt %, less than 7.4 wt %, less than 6 wt %, or less than 5.4 wt %. In terms of lower limits, the flame retardant concentration can be greater than 3 wt %, greater than 4.0 wt %, greater than 5.5 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

In cases where the flame retardant is a non-halogenated flame retardant, the non-halogenated flame retardant may be present in an amount of at least 5 wt. %, based on the total weight of the composition, e.g., at least 7.5 wt. %, at least 10 wt. %, or at least 12.5 wt. %. In terms of upper limits, the non-halogenated flame retardant is present in an amount of less than 25 wt. %, e.g., less than 22.5 wt. %, less than 20 wt. %, or less than 17.5 wt. %. In terms of ranges, the non-halogenated flame retardant is present from 5 to 25 wt. %, e.g., from 7.5 to 22.5 wt. %, from 10 to 20 wt. %, or from 12.5 to 17.5 wt. %.

Other Additives

The polyamide composition can also include one or more chain terminators, viscosity modifiers, plasticizers, e.g., diundecyl phthalate, UV stabilizers, catalysts, other polymers, delusterants, antimicrobial agents, antistatic agents, optical brighteners, extenders, processing aids, talc, mica, gypsum, wollastonite and other commonly used additives known to those of skill in the art. Additional suitable additives may be found in Plastics Additives, An A-Z reference, Edited by Geoffrey Pritchard (1998). The optional addition of a stabilizer to the additive dispersion is present in an exemplary embodiment. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkylsulfates, alkylsulfonates, alkyl-benzenesulfonates, alkylphosphates, alkylphosphonates, alkyl-naphthalene sulfonates, carboxylic acids and perfluoronates.

In some embodiments, the stain resistance of the polyamide composition can be improved by salt-blending the polyamide precursor with a cationic dye modifier, such as 5-sulfoisophthalic acid or salts or other derivatives thereof.

Chain extenders can also be included in the polyamide composition. Suitable chain extender compounds include bis-N-acyl bislactam compounds, isophthaloyl bis-caprolactam (IBC), adipoyl bis-caprolactam (ABC), terphthaloyl bis-caprolactam (TBS), and mixtures thereof.

The polyamide composition can also include anti-block agents. Inorganic solids, usually in the form of diatomaceous earth, represent one class of materials that can be added to the disclosed polyamide composition. Non-limiting examples include calcium carbonate, silicon dioxide, magnesium silicate, sodium silicate, aluminum silicate, aluminum potassium silicate, and silicon dioxide are examples of suitable antiblock agents.

The disclosed polyamide compositions can also include a nucleating agent to further improve clarity and oxygen barrier as well as enhance oxygen barrier. Typically, these agents are insoluble, high melting point species that provide a surface for crystallite initiation. By incorporating a nucleating agent, more crystals are initiated, which are smaller in nature. More crystallites or higher % crystallinity correlates to more reinforcement/higher tensile strength and a more tortuous path for oxygen flux (increased barrier); smaller crystallites decreases light scattering which correlates to improved clarity. Non-limiting examples include calcium fluoride, calcium carbonate, talc and Nylon 2,2.

The polyamide compositions can also include organic anti-oxidants in the form of hindered phenols such as, but not limited to, Irganox 1010, Irganox 1076 and Irganox 1098; organic phosphites such as, but not limited to, Irgafos 168 and Ultranox 626; aromatic amines, metal salts from Groups IB, IIB, III, and IV of the periodic table and metal halides of alkali and alkaline earth metals.

In some embodiments, any or some of the steps or components disclosed herein may be considered optional. In some cases, any or some of the aforementioned items in this description may expressly excluded, e.g., via claim language. For example claim language may be modified to recite that the polymer composition does not comprise or excludes a flame retardant.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

Glass Fiber

The polyamide composition includes a reinforcing filler, e.g., glass fiber. The glass fiber can include soda lime silicate, zirconium silicates, calcium borosilicates, alumina-calcium borosilicates, calcium aluminosilicates, magnesium aluminosilicates, or combinations thereof. The glass fiber can include long fibers, e.g., greater than 6 mm, short fibers, e.g., less than 6 mm, or combinations thereof. The glass fiber can be milled.

The amount of glass fiber in the polyamide composition relative to the amounts of the other composition components can be selected to advantageously provide additional strength without negatively affecting material ductility. The concentration of glass fiber in the polyamide composition can, for example, range from 10 wt % to 60 wt %, e.g., from 10 wt % to 40 wt %, from 15 wt % to 45 wt %, from 20 wt % to 50 wt %, from 25 wt % to 55 wt %, or from 30 wt % to 60 wt %. In some embodiments, the concentration of glass fiber ranges from 25 wt % to 40 wt % e.g., from 25 wt % to 34 wt %, from 26.5 wt % to 35.5 wt %, from 28 wt % to 37 wt %, from 29.5 wt % to 38.5 wt %, or from 31 wt % to 40 wt %. In certain aspects, the concentration of glass fiber ranges from 30 wt % to 35 wt %. In terms of upper limits, the glass fiber concentration can be less than 60 wt %, e.g., less than 55 wt %, less than 50 wt %, less than 45 wt %, less than 40 wt %, less than 38.5 wt %, less than 37 wt %, less than 35.5 wt %, less than 34 wt %, less than 32.5 wt %, less than 31 wt %, less than 29.5 wt %, less than 28 wt %, less than 26.5 wt %, less than 25 wt %, less than 20 wt %, or less than 15 wt %. In terms of lower limits, the glass fiber concentration can be greater than 10 wt %, e.g., greater than 15 wt %, greater than 20 wt %, greater than 25 wt %, greater than 26.5 wt %, greater than 28 wt %, greater than 29.5 wt %, greater than 31 wt %, greater than 32.5 wt %, greater than 34 wt %, greater than 35.5 wt %, greater than 37 wt %, greater than 38.5 wt %, greater than 40 wt %, greater than 45 wt %, greater than 50 wt %, or greater than 55 wt %. Lower concentrations, e.g., less than 10 wt %, and higher concentrations, e.g., greater than 60 wt %, are also contemplated.

Antiviral Activity

The polymer compositions described herein exhibit antiviral properties, e.g., antiviral activity. Furthermore, the products formed from the polymer compositions may also exhibit antiviral properties. In particular, by utilizing a polymer composition having the aforementioned zinc, copper, silver and/or phosphorus compounds in the disclosed concentrations, a polymer composition exhibiting antiviral properties can be prepared.

In some embodiments, the polymer compositions, and the products formed therefrom, exhibit permanent, e.g., near permanent, antiviral properties. Said another way, the antiviral properties of the polymer composition last for a prolonged period of time, e.g., longer than one or more day, longer than one or more week, longer than one or more month, or longer than one or more years.

The antiviral properties may include any antiviral effect. In some embodiments, for example, the antiviral properties of the polymer composition include limiting, reducing, or inhibiting infection of a virus. In some embodiments, the antiviral properties of the polymer composition include limiting, reducing, or inhibiting pathogenesis of a virus. In some cases, the polymer composition may limit, reduce, or inhibit both infection and pathogenesis of a virus.

The virus affected by the antiviral properties of the polymer composition is not particularly limited. In some embodiments, for example, the virus is an adenovirus, a herpesvirus, an ebolavirus, a poxvirus, a rhinovirus, a coxsackievirus, an arterivirus, an enterovirus, a morbillivirus, a coronavirus, an influenza A virus, an avian influenza virus, a swine-origin influenza virus, or an equine influence virus. In some embodiments, the antiviral properties include limiting, reducing, or inhibiting the infection or pathogenesis of one of virus, e.g., a virus from the above list. In some embodiments, the antiviral properties include limiting, reducing, or inhibiting the infection or pathogenesis of multiple viruses, e.g., a combination of two or more viruses from the above list.

In some cases, the virus is a coronavirus, e.g., severe acute respiratory syndrome coronavirus (SARS-CoV), Middle East respiratory syndrome coronavirus (MERS-CoV), or severe acute respiratory syndrome coronavirus 2 (SARS-CoV-2) (e.g., the coronavirus that causes COVID-19). In some cases, the virus is structurally related to a coronavirus.

In some cases, the virus is an influenza virus, such as an influenza A virus, an influenza B virus, an influenza C virus, or an influenza D virus, or a structurally related virus. In some cases, the virus is identified by an influenza A virus subtype, e.g., H1N1, H1N2, H2N2, H2N3, H3N1, H3N2, H3N8, H5N1, H5N2, H5N3, H5N6, H5N8, H5N9, H6N1, H7N1, H7N4, H7N7, H7N9, H9N2, or H10N7.

In some cases, the virus is a the virus is a bacteriophage, such as a linear or circular single-stranded DNA virus (e.g., phi X 174 (sometimes referred to as ΦX174)), a linear or circular double-stranded DNA, a linear or circular single-stranded RNA, or a linear or circular double-stranded RNA. In some cases, the antiviral properties of the polymer composition may be measured by testing using a bacteriophage, e.g., phi X 174.

In some cases, the virus is an ebolavirus, e.g., Bundibugyo ebolavirus (BDBV), Reston ebolavirus (RESTV), Sudan ebolavirus (SUDV), TaiForest ebolavirus (TAFV), or Zaire ebolavirus (EBOV). In some cases, the virus is structurally related to an ebolavirus.

The antiviral activity may be measured by a variety of conventional methods. For example, ISO 18184:2019 and/or AATCC TM100 may be utilized to assess the antiviral activity. In one embodiment, the polymer composition, e.g., products formed from the polymer composition inhibits the pathogenesis (e.g., growth) of a virus in an amount ranging from 60% to 100%, e.g., from 60% to 99.999999%, from 60% to 99.99999%, from 60% to 9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 990.9999%, from 65% to 990.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.99990%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.99990%, from 80% to 99.999% from 80% to 99.999%, 90% to 99.999%, 99% to 99.999% or 99% to 99.9%, from 80% to 100%, from 80% to 99.99%, from 80% to 99.9%, from 80% to 99%, from 80% to 98%, or from 80% to 95%. In terms of lower limits, a belt formed from the polymer composition may inhibit greater than 60% of pathogenesis of the virus, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

In some cases, the efficacy may be measured in term of log reduction. For example, the composition/products may demonstrate a virus log reduction greater than 0.5, as determined via ISO 18184:2019 or ASTM 2197 (current year), e.g., greater than 1.0, greater than 1.2, greater than 1.5. greater than 2.0, greater than 2.5, greater than 3.0, greater than 4.0, or greater than 5.0.

Antimicrobial Activity

In some embodiments, the polymer compositions, and the products formed therefrom, may also exhibit antimicrobial activity. In some cases, the antimicrobial activity may be the result of an additional antimicrobial additive, as described below, or a result of the polymer composition itself. In some embodiments, the polymer compositions, and the products formed therefrom, exhibit antimicrobial properties. Said another way, the antimicrobial properties of the polymer composition last for a prolonged period of time, e.g., longer than one or more day, longer than one or more week, longer than one or more month, or longer than one or more years.

The antimicrobial properties may include any antimicrobial effect. In some embodiments, for example, the antimicrobial properties of the polymer composition include limiting, reducing, or inhibiting infection of a microbe, e.g., a bacterium or bacteria. In some embodiments, the antimicrobial properties of the polymer composition include limiting, reducing, or inhibiting growth and/or killing a bacterium. In some cases, the polymer composition may limit, reduce, or inhibit both infection and growth of a bacterium.

In some cases, the AM/AV properties are antifungal properties. For example, the polymer compositions may be effective in reducing or eliminating fungi such as mold and mildew. Antifungal performance may be measured in terms of the following exemplary fungi: *Aspergillus niger, Penicillium pinophilum, Chaetomium globosom, Trichoderma virens, Aureobasidium pullaulans*.

The bacterium or bacteria affected by the AM/AV properties of the polymer composition is not particularly limited. In some embodiments, for example, the bacterium is a *Streptococcus* bacterium (e.g., *Streptococcus pneumonia, Streptococcus pyogenes*), a *Staphylococcus* bacterium (e.g., *Staphylococcus aureus*, Methicillin-resistant *Staphylococcus aureus* (MRSA)), a *Peptostreptococcus* bacteria (e.g., *Peptostreptococcus anaerobius, Peptostreptococcus asac-* *charolyticus*), or a *Mycobacterium* bacterium, (e.g., *Mycobacterium tuberculosis*), a *Mycoplasma* bacteria (e.g., *Mycoplasma adleri, Mycoplasma agalactiae, Mycoplasma agassizii, Mycoplasma amphoriforme, Mycoplasma fermentans, Mycoplasma genitalium, Mycoplasma haemofelis, Mycoplasma hominis, Mycoplasma hyopneumoniae, Mycoplasma hyorhinis*, Mycoplasmapneumoniae). In some embodiments, the antiviral properties include limiting, reducing, or inhibiting the infection or pathogenesis of multiple bacteria, e.g., a combination of two or more bacteriaa from the above list.

The antimicrobial activity may be measured by various test methods. For example one standard procedure that may be utilized is testing *Staphylococcus aureus* via ISO 22196: 2011. This procedure measures antimicrobial activity by determining the percentage of a given bacterium or bacteria, e.g. *S. aureus* or *E. coli*, inhibited by a tested product. Other tests include ASTM E35.15 WK45351, ASTM E2149, ISO 20743:2013, ASTM 3160 (2018), and AATC 100 (current year).

In one embodiment, a product formed from the polymer composition inhibits the growth (growth reduction) of *Staphylococcus aureus*, as measured by ISO 22196:2011, in an amount ranging from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.9999990%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.999990%, from 80% to 99.9999%, from 80% to 99.999% from 80% to 99.999%, from 80% to 100%, 90% to 99.999%, 99% to 99.999% or 99% to 99.9%, from 80% to 99.99%, from 80% to 99.9%, from 80% to 99%, from 80% to 98%, or from 80% to 95%. In terms of lower limits, a product formed from the polymer composition may inhibit greater than 60% growth of *S. aureus*, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

In terms of *Staphylococcus aureus* efficacy, the AM/AV products inhibit/reduce *Staph aureus* activity, as measured by ISO 22196:2011, by greater than 85%, e.g., greater than 86%, greater than 89%, greater than 90%, greater than 92%, greater than 95%, greater than 97%, greater than 98%, greater than 99%, greater than 99.5%, greater than 99.9%, greater than 99.99%, greater than 99.999%, greater than 99.9999%, greater than 99.99999%, or greater than 99.9999999%.

In some embodiments, the AM/AV products inhibit/reduce *Staph aureus* activity (colony forming units per milliliter), as measured by ASTM E35.15 WK45351, where the product may be extracted with acetone, and then extracted using boiling water for one hour. In such cases, the antiviral product inhibit/reduces *Staph aureus* activity by greater than 75%, e.g., greater than 80%, greater than 85%, greater than 90%, greater than 95%, greater than 97%, greater than 98%, greater than 99%, greater than 99.9%, greater than 99.99%, greater than 99.999%, greater than 99.9999%, greater than 99.99999%, or greater than 99.999999%.

In some embodiments, the products inhibit/reduces *Staph aureus* activity (colony forming units per milliliter), as measured by ASTM E2149, where the products may be extracted with acetone, and then extracted using boiling water for one hour. The test may be modified to employ a single specimen (1.5 grams), 20 ml inoculum, an 8 hour incubation time. In such cases, the AM/AV products inhibit/reduce *Staph aureus* activity by greater than 50%, e.g., greater than 55%, greater than 60%, greater than 63%, greater than 75%, greater than 80%, greater than 85%, greater than 90%, greater than 92%, greater than 95%, greater than 97%, greater than 98%, greater than 99%, greater than 99.9%, greater than 99.99%, greater than 99.999%, greater than 99.99990%, greater than 99.99999%, or greater than 99.999999%.

Efficacy may be characterized in terms of log reduction. In terms of *Staph aureus* log reduction, the composition/products may be determined via ISO 22196:2011 and the composition/products may demonstrate a microbial log reduction greater than 0.8, e.g., greater than 1.0, greater than 1.5. greater than 2.0, greater than 2.5, greater than 3.0, greater than 4.0, greater than 5.0, or greater than 6.0.

*Staph aureus* log reduction of the composition/products may be determined via ISO 20743:2013 and the composition/products may demonstrate a microbial log reduction greater than 0.8, e.g., greater than 1.0, greater than 1.5. greater than 2.0, greater than 2.5, greater than 3.0, greater than 4.0, greater than 5.0, or greater than 6.0.

*Staph aureus* log reduction of the composition/products may be determined via ASTM 3160 (2018) and the composition/products may demonstrate a microbial log reduction greater than 0.6, e.g., greater than 0.8, greater than 1.0, greater than 1.5. greater than 2.0, greater than 2.5, greater than 3.0, greater than 4.0, greater than 5.0, or greater than 6.0.

*Staph aureus* log reduction of the composition/products may be determined via AATC 100 (current year) and the composition/products may demonstrate a microbial log reduction greater than 3.0, e.g., greater than 3.5, greater than 4.0. greater than 5.5, or greater than 6.0.

*Escherichia coli* and/or *Klebsiella pneumoniae* efficacy may also be determined using the aforementioned tests. In some embodiments, a product formed from the polymer composition inhibits the growth (growth reduction) of *Escherichia coli* and/or *Klebsiella pneumoniae*, as measured by the test mentioned above. The ranges and limits for *Staph aureus* are applicable to *Escherichia coli* and/or *Klebsiella pneumoniae* as well.

In terms of *Escherichia co/i* and/or *Klebsiella pneumoniae* log reduction, the composition/products may be determined via the aforementioned tests, e.g., via ISO 22196: 2011, and the composition/products may demonstrate a microbial log reduction greater than 1.5, e.g., greater than 2.0, greater than 2.15, greater than 2.5, greater than 2.7, greater than 3.0, greater than 3.3, greater than 4.0, greater than 5.0, or greater than 6.0.

In terms of antifungal performance, the composition/products may be measured via ASTM G21-15 (2021), and the composition/products may demonstrate a rating less than 3.0, e.g., less than 2.5, less than 2.0, less than 1.5, less than 1.0, less than 0.5, less than 0.3, or less than 0.1.

Mechanical Performance Properties

As noted above, the disclosed products synergistically demonstrate superior mechanical performance in addition to the aforementioned AM/AV performance.

Tensile Strength Retention

In some embodiments, when heat aged for 2500 hours over an entire temperature range of from 190° C. to 220° C. and measured at 23° C., the products demonstrate a tensile strength retention of greater than 10%, e.g., greater than 15%, greater than 20%, greater than 25%, greater than 35%, or greater than 50%.

In some embodiments, when heat aged for 3000 hours over an entire temperature range of from 190° C. to 220° C. and measured at 23° C., the products demonstrate a tensile strength retention of greater than 10%, e.g., greater than 15%, greater than 20%, greater than 25%, greater than 35%, or greater than 50%.

In some embodiments, when heat aged for 2500 hours at a temperature of 210° C. and measured at 23° C., the products demonstrate a tensile strength retention of greater than 5%, e.g., greater than 15%, greater than 20%, greater than 25%, greater than 35%, or greater than 50%.

In some embodiments, when heat aged for 3000 hours at a temperature of 210° C. and measured at 23° C., the products demonstrate a tensile strength retention of greater than 5%, e.g., greater than 15%, greater than 20%, greater than 25%, greater than 35%, or greater than 50%.

Tensile Modulus

The products can demonstrate a tensile modulus that, for example, ranges from 2500 MPa to 25000 MPa, e.g., from 2500 MPa to 16000 MPa, from 4750 MPa to 18250 MPa, from 7000 MPa to 20500 MPa, from 5000 MPa to 17000 MPa, from 7000 MPa to 15000 MPa, from 8000 MPa to 12000 MPa, from 8600 MPa to 11500 MPa, from 9250 MPa to 22750 MPa, or from 11500 MPa to 25000 MPa. In terms of upper limits, the tensile modulus can be less than 25000 MPa, e.g., less than 22750 MPa, less than 20500 MPa, less than 18250 MPa, less than 17000 MPa, less than 16000 MPa, less than 15000 MPa, less than 13750 MPa, less than 12000 MPa, less than 11500 MPa, less than 9250 MPa, less than 7000 MPa, or less than 4750 MPa. In terms of lower limits, the tensile modulus can be greater than 2500 MPa, e.g., greater than 4750 MPa, greater than 5000 MPa, greater than 7000 MPa, greater than 8000 MPa, greater than 8600 MPa, greater than 9250 MPa, greater than 11500 MPa, greater than 13750 MPa, greater than 16000 MPa, greater than 18250 MPa, greater than 20500 MPa, or greater than 22750 MPa. Higher tensile moduli, e.g., greater than 25000 MPa, and lower tensile moduli, e.g., less than 2500 MPa, are also contemplated. The tensile modulus of the products can be measured using a standard protocol such as ISO 527-1 (2019).

The polyamide products can demonstrate a tensile strength at break that, for example, ranges from 60 MPa to 300 MPa, e.g., from 60 MPa to 204 MPa, from 84 MPa to 228 MPa, from 108 MPa to 252 MPa, from 132 MPa to 276 MPa, from 135 MPa to 200 MPa, from 140 MPa to 190 MPa, from 145 MPa to 180 MPa, or from 156 MPa to 300 MPa. In terms of upper limits, the tensile strength at break can be less than 300 MPa, e.g., less than 276 MPa, less than 252 MPa, less than 228 MPa, less than 228 MPa, less than 204 MPa, less than 200 MPa, less than 190 MPa, less than 180 MPa, less than 156 MPa, less than 132 MPa, less than 108 MPa, or less than 84 MPa. In terms of lower limits, the tensile strength at break can be greater than 60 MPa, e.g., greater than 84 MPa, greater than 108 MPa, greater than 132 MPa, greater than 135 MPa, greater than 140 MPa, greater than 145 MPa, greater than 156 MPa, greater than 180 MPa, greater than 204 MPa, greater than 228 MPa, greater than 252 MPa, or greater than 276 MPa. Higher tensile strengths, e.g., greater than 300 MPa, and lower tensile strengths, e.g., less than 60 MPa, are also contemplated. The tensile strength at break of the polyamide products can be measure using a standard protocol such as ISO 527-1 (2019).

Tensile Elongation

The polyamide products can demonstrate an elongation (tensile) at break that, for example, ranges from 2.5% to 67.5%, e.g., from 2.5% to 41.5%, from 2.5% to 5%, from 2.7% to 4%, from 2.8% to 3.9%, from 9% to 48%, from 15.5% to 54.5%, from 22% to 61%, or from 28.5% to 67.5%. The products can have an elongation at break ranging from 2.5% to 5%, e.g., from 2.5% to 4%, from 2.75% to 4.25%, from 3% to 4.5%, from 3.25% to 4.75%, or from 3.5% to 5%. In terms of upper limits, the elongation at break can be less than 67.5%, e.g., less than 61%, less than 54.5%, less than 48%, less than 41.5%, less than 35%, less than 28.5%, less than 22%, less than 15.5%, less than 9%, less than 5%, less than 4%, less than 3.9%, less than 4.75%, less than 4.5%, less than 4.25%, less than 4%, less than 3.75%, less than 3.5%, less than 3.25%, less than 3%, or less than 2.75%. In terms of lower limits, the elongation at break can be greater than 2.5%, e.g., greater than 2.7%, greater than 2.75%, greater than 2.8%, greater than 3%, greater than 3.25%, greater than 3.5%, greater than 3.75%, greater than 4%, greater than 4.25%, greater than 4.5%, greater than 4.75%, greater than 5%, greater than 9%, greater than 15.5%, greater than 22%, greater than 28.5%, greater than 35%, greater than 41.5%, greater than 48%, greater than 54.5%, or greater than 61%. Larger elongations, e.g., greater than 67.5%, and smaller elongations, e.g., less than 2.5%, are also contemplated. The elongation at break of the polyamide products can be measured using a standard protocol such as ISO 527-1 (2019, Flexural Modulus The polyamide products can demonstrate a flexural modulus that, for example, ranges from 2500 MPa to 30000 MPa, e.g., from 2500 MPa to 29000 MPa, from 4750 MPa to 18250 MPa, from 7000 MPa to 20500 MPa, from 8500 MPa to 12000 MPa, from 8700 MPa to 11000 MPa, from 8900 MPa to 10000 MPa, from 9250 MPa to 22750 MPa, or from 11500 MPa to 25000 MPa. In terms of upper limits, the flexural modulus can be less than 30000 MPa, e.g., less than 29000, less than 28000, less than 27000, less than 25000, less than 22750 MPa, less than 20500 MPa, less than 18250 MPa, less than 16000 MPa, less than 13750 MPa, less than 12000 MPa, less than 11500 MPa, less than 11000 MPa, less than 10000 MPa, less than 9250 MPa, less than 7000 MPa, or less than 4750 MPa. In terms of lower limits, the flexural modulus can be greater than 2500 MPa, e.g., greater than 4750 MPa, greater than 7000 MPa, greater than 8500 MPa, greater than 8700 MPa, greater than 8900 MPa, greater than 9250 MPa, greater than 11500 MPa, greater than 13750 MPa, greater than 16000 MPa, greater than 18250 MPa, greater than 20500 MPa, or greater than 22750 MPa. Higher flexural moduli, e.g., greater than 25000 MPa, and lower flexural moduli, e.g., less than 2500 MPa, are also contemplated. The flexural modulus of the polyamide products can be measured using a standard protocol such as ISO 178 (2019).

Flexural Strength at Break

The polyamide products can demonstrate a flexural strength at break that, for example, ranges from 100 MPa to 450 MPa, e.g., from 100 MPa to 310 MPa, from 135 MPa to 345 MPa, from 170 MPa to 380 MPa, from 205 MPa to 415 MPa, from 225 MPa to 350 MPa, from 230 MPa to 300 MPa, from 240 MPa to 280 MPa, or from 240 MPa to 450 MPa. In terms of upper limits, the flexural strength at break can be less than 450 MPa, e.g., less than 415 MPa, less than 380 MPa, less than 350 MPa, less than 345 MPa, less than 310 MPa, less than 300 MPa, less than 280 MPa, less than 275 MPa, less than 240 MPa, less than 205 MPa, less than 170 MPa, or less than 135 MPa. In terms of lower limits, the flexural strength at break can be greater than 100 MPa, e.g., greater than 135 MPa, greater than 170 MPa, greater than 205 MPa, greater than 225 MPa, greater than 230 MPa, greater than 240 MPa, greater than 275 MPa, greater than 310 MPa, greater than 345 MPa, greater than 380 MPa, or greater than 415 MPa. Higher strengths, e.g., greater than 450 MPa, and lower strengths, e.g., less than 100 MPa, are also contemplated. The flexural strength at break of the polyamide products can be measured using a standard protocol such as ISO 178 (2019).

Impact Energy

The polyamide products can demonstrate a notched Izod impact energy loss at 23° C. that, for example, ranges from 5 kJ/m$^2$ to "no break," e.g., from 5 kJ/m$^2$ to 50 kJ/m$^2$, from 5 kJ/m$^2$ to 32 kJ/m$^2$, from 9.5 kJ/m$^2$ to 36.5 kJ/m$^2$, from 14 kJ/m$^2$ to 41 kJ/m$^2$, from 18.5 kJ/m$^2$ to 45.5 kJ/m$^2$, or from 23 kJ/m$^2$ to 50 kJ/m$^2$. In terms of upper limits, the notched Izod impact energy loss at 23° C. can be less than 50 kJ/m$^2$, e.g., less than 45.5 kJ/m$^2$, less than 41 kJ/m$^2$, less than 36.5 kJ/m$^2$, less than 32 kJ/m$^2$, less than 27.5 kJ/m$^2$, less than 23 kJ/m$^2$, less than 18.5 kJ/m$^2$, less than 14 kJ/m$^2$, or less than 9.5 kJ/m$^2$. In some cases, the product achieve "no break" performance, which, in some cases, means that the product does not reach a break point after absorbing max energy. In terms of lower limits, the notched Izod impact energy loss at 23° C. can be greater than 5 kJ/m$^2$, e.g., greater than 9.5 kJ/m$^2$, greater than 14 kJ/m$^2$, greater than 18.5 kJ/m$^2$, greater than 23 kJ/m$^2$, greater than 27.5 kJ/m$^2$, greater than 32 kJ/m$^2$, greater than 36.5 kJ/m$^2$, greater than 41 kJ/m$^2$, or greater than 45.5 kJ/m$^2$. Higher Izod impact energy losses at 23° C., e.g., greater than 50 kJ/m$^2$, and lower Izod impact energy losses at 23° C., e.g., less than 5 kJ/m$^2$, are also contemplated. The notched Izod impact energy loss of the polyamide products can be measured using a standard protocol such as ISO 180 (2019).

The polyamide products can demonstrate a notched Izod impact energy loss at −40° C. that, for example, ranges from 3 kJ/m$^2$ to 30 kJ/m$^2$, e.g., from 3 kJ/m$^2$ to 19.2 kJ/m$^2$, from 5.7 kJ/m$^2$ to 21.9 kJ/m$^2$, from 8.4 kJ/m$^2$ to 24.6 kJ/m$^2$, from 11.1 kJ/m$^2$ to 27.3 kJ/m$^2$, or from 13.8 kJ/m$^2$ to 30 kJ/m$^2$/ In terms of upper limits, the notched Izod impact energy loss at −40° C. can be less than 30 kJ/m$^2$, e.g., less than 27.3 kJ/m$^2$, less than 24.6 kJ/m$^2$, less than 21.9 kJ/m$^2$, less than 19.2 kJ/m$^2$, less than 16.5 kJ/m$^2$, less than 13.8 kJ/m$^2$, less than 11.1 kJ/m$^2$, less than 8.4 kJ/m$^2$, or less than 5.7 kJ/m$^2$. In terms of lower limits, the notched Izod impact energy loss at −40° C. can be greater than 3 kJ/m$^2$, e.g., greater than 5.7 kJ/m$^2$, greater than 8.4 kJ/m$^2$, greater than 11.1 kJ/m$^2$, greater than 13.8 kJ/m$^2$, greater than 16.5 kJ/m$^2$, greater than 19.2 kJ/m$^2$, greater than 21.9 kJ/m$^2$, greater than 24.6 kJ/m$^2$, or greater than 27.6 kJ/m$^2$. Higher Izod impact energy losses at −40° C., e.g., greater than 30 kJ/m$^2$, and lower Izod impact energy losses at −40° C., e.g., less than 3 kJ/m$^2$, are also contemplated.

The polyamide products can demonstrate a Charpy notched impact energy loss at 23° C. that, for example, ranges from 6 kJ/m$^2$ to 36 kJ/m$^2$, e.g., from 6 kJ/m$^2$ to 24 kJ/m², from 9 kJ/m² to 27 kJ/m², from 10 kJ/m² to 35 kJ/m², from 10 kJ/m² to 27 kJ/m², from 11 kJ/m² to 25 kJ/m², from 12 kJ/m² to 30 kJ/m², from 15 kJ/m² to 33 kJ/m², or from 18 kJ/m² to 36 kJ/m². In terms of upper limits, the Charpy notched impact energy loss at 23° C. can be less than 36 kJ/m², e.g., less than 35 kJ/m², less than 33 kJ/m², less than 30 kJ/m², less than 27 kJ/m², less than 25 kJ/m², less than 24 kJ/m², less than 21 kJ/m², less than 18 kJ/m², less than 15 kJ/m², less than 12 kJ/m², or less than 9 kJ/m². In terms of lower limits, the Charpy notched impact energy loss at 23° C. can be greater than 6 kJ/m², e.g., greater than 9 kJ/m², greater than 10 kJ/m², greater than 11 kJ/m², greater than 12 kJ/m², greater than 15 kJ/m², greater than 18 kJ/m², greater than 21 kJ/m², greater than 24 kJ/m², greater than 27 kJ/m², greater than 30 kJ/m², or greater than 33 kJ/m². Higher Charpy impact energy losses, e.g., greater than 36 kJ/m², and lower Charpy impact energy losses, e.g., less than 3 kJ/m², are also contemplated. The Charpy notched impact energy loss of the polyamide products can be measured using a standard protocol such as ISO 179-1 (2010).

The polyamide products can demonstrate a Charpy un-notched impact energy loss at 23° C. that, for example, ranges from 70 kJ/m² to "no break," e.g., from 70 kJ/m² to 200 kJ/m², from 70 kJ/m² to 175 kJ/m², from 70 kJ/m² to 120 kJ/m², from 70 kJ/m² to 100 kJ/m², from 72 kJ/m² to 98 kJ/m², from 75 kJ/m² to 95 kJ/m², from 80 kJ/m² to 95 kJ/m², or from 84 kJ/m² to 93 kJ/m². In terms of upper limits, the Charpy un-notched impact energy loss at 23° C. can be less than 200 kJ/m², e.g., less than 180 kJ/m², less than 175 kJ/m², less than 150 kJ/m², less than 120 kJ/m², less than 100 kJ/m², less than 98 kJ/m², less than 95 kJ/m², or less than 93 kJ/m². In some cases, the product achieve "no break" performance. In terms of lower limits, the Charpy un-notched impact energy loss at 23° C. can be greater than 70 kJ/m², e.g., greater than 72 kJ/m², greater than 75 kJ/m², greater than 80 kJ/m², greater than 83 kJ/m², or greater than 84 kJ/m². Higher Charpy impact energy losses, e.g., greater than 150 kJ/m², and lower Charpy impact energy losses, e.g., less than 70 kJ/m², are also contemplated. The Charpy un-notched impact energy loss of the polyamide products can be measured using a standard protocol such as ISO 179-1 (2010).

The polyamide products can demonstrate a Charpy notched impact energy loss at –40° C. that, for example, ranges from 5 kJ/m² to 50 kJ/m², e.g., from 5 kJ/m² to 30 kJ/m², from 6 kJ/m² to 20 kJ/m², from 7 kJ/m² to 18 kJ/m², from 8 kJ/m² to 17 kJ/m², or from 9 kJ/m² to 15 kJ/m². In terms of upper limits, the Charpy un-notched impact energy loss at –40° C. can be less than 50 kJ/m², e.g., less than 30 kJ/m², less than 20 kJ/m², less than 18 kJ/m², less than 17 kJ/m², or less than 15 kJ/m². In terms of lower limits, the Charpy un-notched impact energy loss at –40° C. can be greater than 5 kJ/m², e.g., greater than 6 kJ/m², greater than 7 kJ/m², greater than 8 kJ/m², or greater than 9 kJ/m². Higher Charpy impact energy losses, e.g., greater than 50 kJ/m², and lower Charpy impact energy losses, e.g., less than 5 kJ/m², are also contemplated. The Charpy notched impact energy loss of the polyamide products can be measured using a standard protocol such as ISO 179-1 (2010).

The polyamide products can demonstrate a Charpy un-notched impact energy loss at –40° C. that, for example, ranges from 65 kJ/m² to 150 kJ/m², e.g., from 65 kJ/m² to 120 kJ/m², from 65 kJ/m² to 110 kJ/m², from 70 kJ/m² to 110 kJ/m², from 72 kJ/m² to 105 kJ/m², from 73 kJ/m² to 105 kJ/m², or from 74 kJ/m² to 98 kJ/m². In terms of upper limits, the Charpy un-notched impact energy loss at –40° C. can be less than 150 kJ/m², e.g., less than 120 kJ/m², less than 110 kJ/m², less than 105 kJ/m², or less than 98 kJ/m². In terms of lower limits, the Charpy un-notched impact energy loss at –40° C. can be greater than 65 kJ/m², e.g., greater than 70 kJ/m², greater than 72 kJ/m², greater than 73 kJ/m², or greater than 74 kJ/m². Higher Charpy impact energy losses, e.g., greater than 150 kJ/m², and lower Charpy impact energy losses, e.g., less than 65 kJ/m², are also contemplated. The Charpy un-notched impact energy loss of the polyamide products can be measured using a standard protocol such as ISO 179-1 (2010).

The polyamide products can demonstrate a tan delta (at 60° C.) that, for example, ranges from 0.04 au to 0.5 au, e.g., from 0.04 au to 0.4 au, from 0.042 au to 0.2 au, from 0.044 au to 0.15 au, or from 0.046 to 0.1 au. In terms of upper limits, the tan delta (at 60° C.) can be less than 0.5 au, e.g., less than 0.4 au, less than 0.2 au, less than 0.15 au, or less than 0.1 au. In terms of lower limits, the tan delta (at 60° C.) can be greater than 0.04 au, e.g., greater than 0.042 au, greater than 0.044 au, or greater than 0.046 au. The tan delta (at 60° C.) of the polyamide products can be measured using the centerpoint beam technique.

The polyamide products can demonstrate a tan delta (at 90° C.) that, for example, ranges from 0.143 au to 0.75 au, e.g., from 0.175 au to 0.6 au, from 0.19 au to 0.5 au, from 0.2 au to 0.4 au, or from 0.215 to 0.3 au. In terms of upper limits, the tan delta (at 90° C.) can be less than 0.75 au, e.g., less than 0.6 au, less than 0.5 au, less than 0.4 au, or less than 0.3 au. In terms of lower limits, the tan delta (at 90° C.) can be greater than 0.143 au, e.g., greater than 0.175 au, greater than 0.19 au, greater than 0.2 au, or greater than 0.215 au. The tan delta (at 90° C.) of the polyamide products can be measured using the centerpoint beam technique.

In some embodiments, the polyamide products demonstrate improved maximum tan delta performance. In some cases, maximum tan delta is greater than 0.055, e.g., greater than 0.057, greater than 0.059, greater than 0.061, or greater than 0.063. The maximum tan delta may be measured using Dynamic Mechanical Analysis.

In some embodiments, the molded products demonstrate a heat deflection temperature ranging from 50° C. to 300° C., e.g., from 65° C. to 275° C., from 75° C. to 270° C. or from 76° C. to 266° C. In some cases, where the molded product is filled, the heat deflection temperature may range from 200° C. to 300° C., e.g., from 220° C. to 280° C., from 240° C. to 260° C., or from 250° C. to 260° C. In cases where the molded product is not filled, the heat deflection temperature may range from 50° C. to 125° C., e.g., from 55° C. to 100° C., from 60° C. to 90° C., or from 65° C. to 85° C. In terms of lower limits, the molded products may demonstrate a heat deflection temperature greater than 50° C., e.g., greater than 60° C., greater than 65° C., greater than 75° C., greater than 76° C., greater than 220° C., greater than 240° C., greater than 250° C., or greater than 260° C.

In some embodiments, the molded products demonstrate a melt temperature ranging from 150° C. to 350° C., e.g., from 175° C. to 325° C., from 200° C. to 300° C., from 225° C. to 280° C., or from 245° C. to 275° C. In terms of lower limits, the molded products may demonstrate a melt temperature greater than 150° C., e.g., greater than 175° C., greater than 200° C., greater than 225° C., greater than 245° C., greater than 250° C., or greater than 255° C.

Chemical Resistance

Chemical resistance may be measured via many methods, and such methods are known in the art.

Self-Cleaning/Virus-Inactivating Fabrics

In some cases, the disclosure relates to self-cleaning and/or microbial- or virus-inactivating products that may comprise the compositions disclosed herein. In some embodiments, the products are configured into masks or other personal protective equipment (PPE). Face masks and other PPE can reduce risk of spreading or getting infected with respiratory viruses, such as SARS-CoV-2, the causative agent of Covid-19. However, in some instances (where the microbial/virus is not inactivated), the microbials/viruses can remain infectious in or on the outside of conventional PPE for extended periods of time.

This disclosure relates to self-cleaning and/or microbial- or virus-inactivating products that have the synergistic combination of the ability to trap the microbial/virus and the ability to inactivate or neutralize the microbial/virus. As such, the disclosed fabrics are able to capture and inactivate microbials/viruses before they reach the protected user. In some cases, the composition of the fabric is relevant, as many conventional fabrics, e.g., polypropylene, are unable to effectively trap the microbial/virus (for enough time for inactivation).

It has been discovered that respiratory microbial/viruses can be advantageously inactivated via absorption of droplet containing the microbials/viruses and inactivation thereof on the surface and within the bulk of the fabric. In some embodiments, the products may be constructed from polymers that maintain a moisture balance, e.g., polyamides, and contain embedded zinc ions within their matrix to inactivate any respiratory viruses.

In some specific cases, it has been found that cotton and PA66 readily absorb microbials/viruses, and that zinc ions embedded in the fabrics effectively inactivated the microbials/viruses, which resulted in at least a 2-log 10 reduction in virus titer after 30 seconds, which is more than sufficient to inactivate the number of infectious IAV virus particles (~24 plaque forming units [pfu]) present in a cough.

As shown in some of the Examples, with the disclosed products, after addition of influenza A virus and SARS-CoV-2 thereto, inactivation rates were found to exceed the number of virus particles present in a typical cough. It has also been discovered that the influenza A virus surface protein haemagglutinin and the SARS-CoV-2 surface protein spike are destabilized on the disclosed belts. These belts may thus beneficially confer "self-cleaning" and broad-spectrum viral inactivation properties to PPE and complement existing PPE by reducing the risk of respiratory virus transmission even further.

Zinc/Copper Retention Rate

As noted herein, by utilizing a polymer composition having the aforementioned zinc compound, copper compound, and/or phosphorus compound in the disclosed concentrations, the resultant products are capable of retaining a higher percentage of zinc and/or copper, even after use or wiping or cleaning/scrubbing of the products. Stated another way, the disclosed molded products are able to maintain AM/AV compound content, e.g., zinc content, throughout use/wiping/cleaning, and as such are able to maintain AM/AV properties throughout use of the products.

In some embodiments, the AM/AV products formed from the polymer composition have a zinc and/or copper retention greater than 65% as measured by a washing/cleaning/scrubbing test or dye bath test, e.g., greater than 75%, greater than 80%, greater than 90%, greater than 95%, greater than 97%, greater than 98%, greater than 99%, greater than 99.9%, greater than 99.99%, greater than 99.999%, greater than 99.9999%, greater than 99.99999% or greater than 99.999999%. In terms of upper limits, the AM/AV products have a zinc and/or copper retention of less than 100%, e.g., less than 99.9%, less than 98%, or less than 95%. In terms of ranges, the AM/AV products have a zinc and/or copper retention may be from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%.

Stated another way, in some embodiments, the AM/AV products formed from the polymer composition demonstrate an extraction rate of the zinc and/or copper compound less than 35% as measured by a washing/cleaning/scrubbing or dye bath test, e.g., less than 25%, less than 20%, less than 10%, or less than 5%. In terms of upper limits, the AM/AV products demonstrate an extraction rate of the zinc and/or copper compound greater than 0%, e.g., greater than 0.1%, greater than 2% or greater than 5%. In terms of ranges, the AM/AV products demonstrate an extraction rate of the zinc and/or copper compound from 0% to 35%, e.g., from 0% to 25%, from 0% to 20%, from 0% to 10%, from 0% to 5%, from 0.1% to 35%, from 0.1% to 25%, from 0.1% to 20%, from 0.2% to 10%, from 0.1% to 5%, from 2% to 35%, from 2% to 25%, from 2% to 20%, from 2% to 10%, from 2% to 5%, from 5% to 35%, from 5% to 25%, from 5% to 20%, or from 5% to 10%.

In some cases, zinc retention may be characterized in relation to washing or cleaning cycles. The AM/AV products are capable of retaining a higher percentage of zinc and/or copper, even after use, as such the resulting products have AM/AV properties.

In some embodiments, the AM/AV products formed from the polymer composition have a zinc and/or copper retention greater than 85% as measured in after 5 washes, e.g., greater than 90%, greater than 92%, greater than 95%, greater than 96%, greater than 98%, greater than 99%, or greater than 99.9%.

In some embodiments, the AM/AV products formed from the polymer composition have a zinc and/or copper retention greater than 65% as measured in after 10 washes, e.g., greater than 70%, greater than 72%, greater than 80%, greater than 85%, greater than 90%, greater than 95%, greater than 99%.

In some embodiments, the AM/AV products, e.g., the belts or the segments of the belts demonstrate AM/AV performance retention. For example, when washed or scrubbed for multiple cycles. In some cases, the belt or segments of the belt may have near-permanent AM/AV performance retention. For example, when washed/scrubbed with a cleaning solution (bleach, hydrogen peroxide, isopropyl alcohol, and/or ammonia), the belt or segments of the belt may retain greater than 25% of the original AM/AV performance, e.g., greater than 35%, greater than 50%, greater than 75%, or greater than 100%. In some cases, after washing/scrubbing (for example after 15,000 cycles), the belt or segments of the belt may demonstrate AM/AV log reduction greater than 1.5, e.g., greater than 2.0, greater than 2.15, greater than 2.5, greater than 2.7, greater than 3.0, greater than 3.3, greater than 4.0, greater than 5.0, or greater than 6.0.

Additional Components

In some embodiments, the polymer composition may comprise additional additives. The additives include pigments, hydrophilic or hydrophobic additives, anti-odor additives, additional antiviral agents, and antimicrobial/antifungal inorganic compounds.

In some embodiments, the polymer composition can be combined with color pigments for coloration for the use in fabrics or other components formed from the polymer composition. In some aspects, the polymer composition can be combined with UV additives to withstand fading and degradation in fabrics exposed to significant UV light. In some aspects, the polymer composition can be combined with additives to make the surface of the product hydrophilic or hydrophobic. In some aspects, the polymer composition can be combined with a hygroscopic material, e.g., to make the products formed therefrom more hygroscopic. In some aspects, the polymer composition can be combined with additives to make the product flame retardant or flame resistant. In some aspects, the polymer composition can be combined with additives to make the product stain resistant. In some aspects, the polymer composition can be combined with pigments with the antimicrobial compounds so that the need for conventional dyeing and disposal of dye materials is avoided.

In some embodiments, the polymer composition may further comprise additional additives. For example, the polymer composition may comprise a delusterant. A delusterant additive may improve the appearance and/or texture of the products produced from the polymer composition. In some embodiments, inorganic pigment-like materials can be utilized as delusterants—zinc compounds are not included as delusterants. The delusterants may comprise one or more of titanium dioxide, barium sulfate, barium titanate, magnesium titanate, calcium titanate, lithopone, zirconium dioxide, calcium sulfate, barium sulfate, aluminum oxide, thorium oxide, magnesium oxide, silicon dioxide, talc, mica, and the like. In preferred embodiments, the delusterant comprises titanium dioxide. It has been found that the polymer compositions that include delusterants comprising titanium dioxide produce products that greatly resemble natural products with improved appearance and/or texture. It is believed that titanium dioxide improves appearance and/or texture by interacting with the zinc compound, the phosphorus compound, and/or functional groups within the polymer.

In one embodiment, the polymer composition comprises the delusterant in an amount ranging from 0.0001 wt. % to 3 wt. %, e.g., 0.0001 wt. % to 2 wt. %, from 0.0001 to 1.75 wt. %, from 0.001 wt. % to 3 wt. %, from 0.001 wt. % to 2 wt. %, from 0.001 wt. % to 1.75 wt. %, from 0.002 wt. % to 3 wt5, from 0.002 wt. % to 2 w %, from 0.002 wt. % to 1.75 wt. %, from 0.005 wt. % to 3 wt. %, from 0.005 wt. % to 2 wt. %, from 0.005 wt. % to 1.75 wt. %. In terms of upper limits, the polymer composition may comprise less than 3 wt. % delusterant, e.g., less than 2.5 wt. %, less than 2 wt. % or less than 1.75 wt. %. In terms of lower limits, the polymer composition may comprise greater than 0.0001 wt. % delusterant, e.g., greater than 0.001 wt. %, greater than 0.002 wt. %, or greater than 0.005 wt. %.

In some embodiments, the polymer composition may further comprises colored materials, such as carbon black, copper phthalocyanine pigment, lead chromate, iron oxide, chromium oxide, and ultramarine blue.

In some embodiments, the polymer composition may include additional antiviral agents other than zinc. The additional antimicrobial agents may be any suitable antiviral. Conventional antiviral agents are known in the art and may be incorporated in the polymer composition as the additional antiviral agent or agents. For example, the additional antiviral agent may be an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some aspects, the additional antimicrobial agent or agents are added to the polymer composition.

In some embodiments, the polymer composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer composition.

Processes for Making Products

Processes for making molded products may vary widely, and many processes are known.

The present disclosure also relates to processes of producing the polyamide compositions. The methods include providing one or more polyamide polymers, zinc compound and/or copper compound, and optionally one or more molding additives. The methods can further include selecting the type and relative amounts of the one or more polyamide polymers, zinc/copper, and additives to provide desired AM/AV/mechanical properties to the resulting polyamide composition. The methods further include combining the components to produce the polyamide composition. In some embodiments, the methods further include selecting, providing, and/or combining one or more dyes such as nigrosine, one or more pigments such as carbon black, and/or one or more melt stabilizers.

The components of the polyamide composition can be mixed and blended together to produce the polyamide composition, or can be formed in situ using appropriate reactants. The terms "adding" or "combining" without further clarification are intended to encompass either the addition of the material itself to the composition or the in situ formation of the material in the composition. In another embodiment, two or more materials to be combined with the composition are simultaneously added via masterbatch. Masterbatches may employ higher amounts of AM/AV compound, see higher ranges disclosed herein. Beneficially, the masterbatches may be employed as one method to achieve the desired zinc loading levels.

The antiviral agent may be added to the polyamide during melt polymerization, and thereafter, the belt (or other product) may be formed from extrusion and/or molding. Of course, other forming methods are also contemplated. While polyamide may be used to explain one aspect of the disclosure, it is understood that numerous polymers may be used herein without deviating from the present scope of the disclosure.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims or the equivalents thereof.

EXAMPLES

Examples 1-11 and Comparative Example A were prepared by combining the components in the amounts shown in Table 1 and compounding in a twin-screw extruder. The compositions were melted, additives were added to the melt, and the resultant mixture was extruded and pelletized.

The AM/AV additive was zinc compound, e.g., zinc oxide, or zinc ammonium adipate, or zinc chloride. Where indicated sterically hindered phenolic antioxidant Irganox® 1098 (available from BASF) and/or Songnox®, from Songwon were employed as antioxidants. The copper-complex heat stabilizer used was Bruggolen® H3386 (available from Bruggemann Chemical). The flame retardant was melamine cyanurate and/or zinc borate. The impact modifier was Fusabond® N493, from Dow Chemical. Where indicated, diundecyl phthalate was employed as a plasticizer.

Example A demonstrated log reductions well under 1.0, e.g., 0.27 and 0.32, which indicates little or no antimicrobial efficiency. As one direct comparison, Example 8 and Comparative Example A have very similar components, yet the AM/AV performance for Example 8 is surprisingly orders of magnitude better (99.999% and log 4 vs 52%/46% and log 0.27 and 0.32). Such an increase with a minimal compositional change is unexpected. Also, in addition to the AM/AV efficacy, the mechanical performance was synergistically in line with the ranges and limits discussed above.

The molded panels are representative of the materials from which conveyor belt segments can be prepared, e.g., stamped or molded or cut. Thus, segments formed from the molded panels would have similar AM/AV performance.

In addition, the composition of Example 11 was used as the polymer composition to form the base of a segment, and the composition of Example 4 was used as the partial (sticky) layer, configured atop the segment. The sticky layer had a surface tension that was 42 dyne/cm and the base of the segment had a surface tension of 48 dyne/cm ((42-48)/

TABLE 1

AM/AV Polymer Compositions

| Ex. | PA-6, 6 (or 612; 66,612; 66/6) | PA-6 | Glass | ZnO | FR/IM | Heat Stab. | Plas. | Antiox. | Melt stab. | Addt'l Adds. |
|---|---|---|---|---|---|---|---|---|---|---|
| 1 | 91.9 | | | 0.5 | 7 | 0.5 | | | 0.1 | |
| 2 | 90 | | | 0.5 | 7 | 0.5 | 1.8 | 0.5 + 0.02 | 0.1 | 0.1 |
| 3 | 44.35 | 9.0 | 25 | 0.3 | 20 + 1 | 0.25 | | | 0.1 | |
| 4 | 78.3 | | | 0.5 | 18 | 2.25 | | 0.35 | 0.25 | 0.35 |
| 5 | 78.7 (612) | | | 0.5 | 20 | 0.3 | 0.5 | | | |
| 6 | 80.25 | 2.0 | | 0.3 | 12 | 4.5 | | 0.35 | 0.25 | 0.35 |
| 7 | 82.6 | | | 0.3 | 12 | 4.5 | | | 0.25 | 0.35 |
| 8 | 95.24 | | | 0.5 | | | | | 0.26 | 4.0 |
| 9 | 95.23 | | | 0.5 | 4 | | | | | 0.27 |
| 10 | 99.5 | | | 0.5 | | | | | | |
| 11 | 66.45 | | 31.05 | 0.5 | | 0.35 | | | | 1.5 + 0.15 |
| 12 | 99.9 (66/612) | | | 0.1 | | | | | | |
| 13 | 99.75 (66/6) | | | 0.25 | | | | | | |
| A | 95.74 | | | — | | | | | 0.26 | 4.0 |

Panels were molded from the pellets, and the panels were tested for AM/AV efficacy, in accordance with ISO 22196: 2011. The results are presented in Table 2.

TABLE 2

AM/AV Performance

| Ex. | S. Aureus, kill rate | E. Coli, kill rate | S. Aureus, log reduction | E. Coli, Log reduction |
|---|---|---|---|---|
| 1 | >99.99 | >99.99 | log 4 | log 4 |
| 2 | >99.99 | >99.999 | log 4 | log 5 |
| 3 | >99.99 | >99.99 | log 4 | log 4 |
| 4 | >99.99 | >99.999 | log 4 | log 5 |
| 5 | >99.999 | >99.999 | log 5 | log 5 |
| 6 | >99.999 | >99.999 | log 5 | log 5 |
| 7 | >99.999 | >99.999 | log 5 | log 5 |
| 8 | >99.999 | >99.999 | log 5 | log 5 |
| 9 | >99.99 | >99.999 | log 4 | log 5 |
| 10 | >99.999 | >99.999 | log 5 | log 5 |
| 11 | >99.999 | >99.999 | log 4 | log 4 |
| 12 | >99.999 | >99.999 | log 4 | log 4 |
| 13 | >99.999 | >99.999 | log 4 | log 4 |
| A | 52 | 46 | log 0.27 | log 0.32 |

As shown in Table 2, the molded samples formed from the polymer compositions described herein demonstrated excellent AM/AV efficacy. In all cases, reduction was log 3 or better, in many cases log 4. In contrast, Comparative 42=14% greater). The resultant segment demonstrated the AM/AV log reductions shown above and also, advantageously, demonstrated sticky performance (along with other mechanical performance imporovements), which prevented slippage of the segment while in use.

To demonstrate washablilty, molded panels were prepared using the compositions of Examples 4, 5, 8, and 11. The panels were subjected to 15,00 scrub/wash cycles using a microfiber pad and various wash solutions: bleach (Clorox© Germicidal); hydrogen peroxide (Swan 3%); isopropyl alcohol (70 wt %); and ammonia (Austin's Clear Ammonia, 2% ammonium hydroxide). The molded panels were tested for AM/AV performance after the scrub/wash cycles. The results are presented in Table 3.

TABLE 3

AM/AV Performance after washing

| Ex. | | S. Aureus, kill rate | E. Coli, kill rate | S. Aureus, log reduction | E. Coli, Log reduction |
|---|---|---|---|---|---|
| 4 | | | | | |
| | Bleach | >99.999 | >99.999 | log 5 | log 5 |
| | $H_2O_2$ | >99.99 | >99.999 | log 4 | log 5 |
| | IPA | >99.99 | >99.999 | log 4 | log 5 |
| | Ammonia | >99.9 | >99.999 | log 3 | log 5 |

TABLE 3-continued

AM/AV Performance after washing

| Ex. | S. Aureus, kill rate | E. Coli, kill rate | S. Aureus, log reduction | E. Coli, Log reduction |
|---|---|---|---|---|
| 5 | | | | |
| Bleach | >99.999 | >99.999 | log 5 | log 5 |
| H₂O₂ | >99.99 | >99.999 | log 4 | log 5 |
| IPA | >99.999 | >99.999 | log 5 | log 5 |
| Ammonia | >99.999 | >99.999 | log 5 | log 5 |
| 8 | | | | |
| Bleach | >99.999 | >99.999 | log 5 | log 5 |
| H₂O₂ | >99.999 | >99.999 | log 5 | log 5 |
| IPA | >99.999 | >99.999 | log 5 | log 5 |
| Ammonia | >99.999 | >99.999 | log 5 | log 5 |
| 11 | | | | |
| Bleach | >99.999 | >99.999 | log 5 | log 5 |
| H₂O₂ | >99.999 | >99.99 | log 5 | log 4 |
| IPA | >99.9 | >99.999 | log 3 | log 5 |
| Ammonia | >99.999 | >99.99 | log 5 | log 4 |

The results show that the AM/AV performance is retained over time and wash cycles, e.g., the AM/AV performance does not wash away.

EMBODIMENTS

As used below, any reference to a series of embodiments is to be understood as a reference to each of those embodiments disjunctively (e.g., "Embodiments 1-4" is to be understood as "Embodiments 1, 2, 3, or 4").

Embodiment 1: an antimicrobial conveyor belt apparatus comprising multiple segments each having a body portion and interlocking fingers extending from the body portion; wherein the segments comprise a polymer composition comprising from 50 wt. % to 99.9 wt. % of a polymer, from 0.01 wt % to 10 wt % zinc, optionally from a zinc compound, less than 1 wt % of a phosphorus compound, and from 0 wt % to 20 wt % molding additives; wherein the belt apparatus demonstrates a *Staphylococcus aureus* log reduction greater than 1.0, as determined via ISO 22196:2011.

Embodiment 2: an embodiment of embodiment 1 wherein at least one segment further comprises a partial layer comprising a partial layer polymer composition.

Embodiment 3: an embodiment of embodiment 1 or 2 wherein the surface tension of the polymer composition may be at least 1% greater, e.g., at least 5%, than the surface tension of the sticky polymer composition.

Embodiment 4: an embodiment of any of embodiments 1-3 wherein the partial layer polymer composition comprises olefins, polyesters, polyamides, vulcanizates, or polyurethanes, or combinations thereof.

Embodiment 5: an embodiment of any of embodiments 1-4 wherein the partial layer polymer composition comprises a rubber-based material.

Embodiment 6: an embodiment of any of embodiments 1-5 wherein the partial layer polymer composition comprises santoprene.

Embodiment 7: an embodiment of any of embodiments 1-6 wherein the partial layer polymer composition comprises modified santoprene comprising santoprene and polyamide.

Embodiment 8: an embodiment of any of embodiments 1-7 wherein the partial layer polymer composition comprises flexible polyamide.

Embodiment 9: an embodiment of any of embodiments 1-8 wherein the partial layer polymer composition comprises an AM/AV compound.

Embodiment 10: an embodiment of any of embodiments 1-9 wherein the relative viscosity of the segment polymer composition is greater than 20.

Embodiment 11: an embodiment of any of embodiments 1-10 wherein the segment polymer composition comprises PA-6,6 or PA-6 or PA-6,12, or combinations thereof.

Embodiment 12: an embodiment of any of embodiments 1-11 wherein the fingers of one of the segments interlock with the fingers of an adjacent segment.

Embodiment 13: an embodiment of any of embodiments 1-12 wherein at least one of the fingers each segment defines a aperture extending therethrough.

Embodiment 14: an embodiment of any of embodiments 1-13 wherein the aperture of one of the segments aligns with the aperture of an adjacent segment to define an opening extending through the respective interlocking fingers.

Embodiment 15: an embodiment of any of embodiments 1-14 further comprising a connecting rod extending through the path.

Embodiment 16 an embodiment of any of embodiments 1-15 wherein the belt apparatus demonstrates an *Escherichia coli* log reduction greater than 1.0, as determined via ISO 22196:2011 and/or a *Klebsiella pneumonia* log reduction greater than 1.0, as determined via ISO 22196:2011.

Embodiment 17 an embodiment of any of embodiments 1-16 wherein one of the segments demonstrates a tensile modulus greater than 2500 MPa and/or a Charpy un-notched impact energy loss greater than 70 kJ/m², at 23° C.

Embodiment 18 an embodiment of any of embodiments 1-17 wherein the polymer is hydrophilic and/or hygroscopic and is capable of absorbing greater than 1.5 wt % water, based on the total weight of the polymer.

Embodiment 19 an embodiment of any of embodiments 1-18 wherein the segment polymer composition comprises from 1000 ppm to 7000 wppm zinc.

Embodiment 20 an embodiment of any of embodiments 1-19 wherein the polymer composition comprises from 2 wt % to 20 wt % of impact modifier and/or from 0.1 to 5 wt % heat stabilizer and/or from 0.05 wt % to 3 wt % melt stabilizer.

We claim:

1. An antimicrobial conveyor belt apparatus comprising:
    multiple segments each having a body portion and interlocking fingers extending from the body portion,
    wherein the segments comprise a segment polymer composition comprising:
        from 50 wt. % to 99.9 wt. % of a polymer,
        from 0.01 wt. % to 10 wt. % zinc, optionally from a zinc compound,
        less than 1 wt. % of a phosphorus compound, and
        from 0 wt. % to 20 wt. % molding additives;
    wherein the segment polymer composition comprises PA-6,6 or PA-6 or PA-6,12, or combinations thereof; and
    wherein the conveyor belt apparatus demonstrates a *Staphylococcus aureus* log reduction greater than 1.0, as determined via ISO 22196:2011.

2. The conveyor belt apparatus of claim 1, wherein at least one segment further comprises a partial layer comprising a partial layer polymer composition.

3. The conveyor belt apparatus of claim 2, wherein a surface tension of the segment polymer composition is at least 1% greater than a surface tension of the partial layer polymer composition.

4. The conveyor belt apparatus of claim 2, wherein the partial layer polymer composition comprises olefins, polyesters, polyamides, vulcanizates, or polyurethanes, or combinations thereof.

5. The conveyor belt apparatus of claim 2, wherein the partial layer polymer composition comprises a rubber-based material.

6. The conveyor belt apparatus of claim 2, wherein the partial layer polymer composition comprises santoprene.

7. The conveyor belt apparatus of claim 6, wherein the partial layer polymer composition comprises modified santoprene comprising santoprene and polyamide.

8. The conveyor belt apparatus of claim 2, wherein the partial layer polymer composition comprises flexible polyamide.

9. The conveyor belt apparatus of claim 2, wherein the partial layer polymer composition comprises an AM/AV compound.

10. The conveyor belt apparatus of claim 1, wherein a relative viscosity of the segment polymer composition is greater than 20.

11. The conveyor belt apparatus of claim 1, wherein the fingers of one of the segments interlock with the fingers of an adjacent segment, wherein at least one of the fingers of each segment defines a respective aperture extending therethrough, wherein the respective aperture of one of the segments aligns with the respective aperture of an adjacent segment to define an opening extending through interlocking fingers of the segments, and wherein the conveyor belt apparatus further comprising a connecting rod extending through the opening.

12. The conveyor belt apparatus of claim 1, wherein the conveyor belt apparatus demonstrates an *Escherichia coli* log reduction greater than 1.0, as determined via ISO 22196:2011 and/or a *Klebsiella pneumonia* log reduction greater than 1.0, as determined via ISO 22196:2011.

13. The conveyor belt apparatus of claim 1, wherein one of the segments demonstrates a tensile modulus greater than 2500 MPa and/or a Charpy un-notched impact energy loss greater than 70 KJ/m$^2$, at 23° C.

14. The conveyor belt apparatus of claim 1, wherein the polymer is hydrophilic and/or hygroscopic and is capable of absorbing greater than 1.5 wt. % water, based on the total weight of the polymer.

15. The conveyor belt apparatus of claim 1, wherein the segment polymer composition comprises from 1000 parts per million by weight (wppm) to 7000 wppm zinc.

16. The conveyor belt apparatus of claim 1, wherein the segment polymer composition comprises from 2 wt. % to 20 wt. % of impact modifier and/or from 0.1 wt. % to 5 wt. % heat stabilizer and/or from 0.05 wt. % to 3 wt. % melt stabilizer.

17. An antimicrobial conveyor belt apparatus comprising:
multiple segments each having a body portion and interlocking fingers extending from the body portion,
wherein the segments comprise a segment polymer composition comprising:
from 50 wt. % to 99.9 wt. % of a polymer, and
from 0.01 wt. % to 10 wt. % zinc, optionally from a zinc compound;
wherein the segment polymer composition further comprises from 2 wt. % to 20 wt. % of impact modifier and/or from 0.1 wt. % to 5 wt. % heat stabilizer and/or from 0.05 wt. % to 3 wt. % melt stabilizer; and
wherein the conveyor belt apparatus demonstrates (i) a *Staphylococcus aureus* log reduction greater than 1.0, (ii) an *Escherichia coli* log reduction greater than 1.0, and/or (iii) a *Klebsiella pneumonia* log reduction greater than 1.0, as determined via ISO 22196:2011.

18. An antimicrobial conveyor belt apparatus comprising:
multiple segments each having a body portion and interlocking fingers extending from the body portion,
wherein the segments comprise a segment polymer composition comprising:
from 50 wt. % to 99.9 wt. % of a polymer, and
from 0.01 wt. % to 10 wt. % zinc, optionally from a zinc compound;
wherein at least one segment further comprises a partial layer comprising one or more of a rubber-based material, a santoprene material, a polyamide-modified santoprene material, a flexible polyamide material, or an AM/AV compound; and
wherein the conveyor belt apparatus demonstrates (i) a *Staphylococcus aureus* log reduction greater than 1.0, (ii) an *Escherichia coli* log reduction greater than 1.0, and/or iii) a *Klebsiella pneumonia* log reduction greater than 1.0, as determined via ISO 22196:2011.

* * * * *